United States Patent [19]

Goto

[11] Patent Number: 4,708,445
[45] Date of Patent: Nov. 24, 1987

[54] LARGE APERTURE RATIO PHOTOGRAPHIC LENS SYSTEM

[75] Inventor: Hisashi Goto, Tokyo, Japan

[73] Assignee: Olympus Optical Co., Ltd., Tokyo, Japan

[21] Appl. No.: 666,282

[22] Filed: Oct. 29, 1984

[30] Foreign Application Priority Data

Nov. 7, 1983 [JP] Japan .................. 58-207357

[51] Int. Cl.$^4$ .............................................. G02B 13/02
[52] U.S. Cl. ...................................... 350/454; 350/450
[58] Field of Search .......................... 350/454–457, 350/450

[56] References Cited

U.S. PATENT DOCUMENTS

| 4,457,595 | 7/1984 | Mihara | 350/454 |
| 4,534,626 | 8/1985 | Mihara | 350/454 |
| 4,558,928 | 12/1985 | Imaizumi | 350/454 |

FOREIGN PATENT DOCUMENTS

| 52-7723 | 1/1977 | Japan . |
| 55-28038 | 2/1980 | Japan . |
| 56-107208 | 8/1981 | Japan . |
| 57-8513 | 1/1982 | Japan . |
| 57-46221 | 3/1982 | Japan . |
| 57-192916 | 11/1982 | Japan . |
| 58-21710 | 2/1983 | Japan . |

*Primary Examiner*—John K. Corbin
*Assistant Examiner*—Scott J. Sugarman
*Attorney, Agent, or Firm*—Cushman, Darby & Cushman

[57] ABSTRACT

A large aperture ratio photographic lens system comprising a first lens group having positive refractive power, a second lens group having negative refractive power, a stop, and a third lens group comprising a negative lens element arranged in the rearmost position and having positive refractive power as a whole, the large aperture ratio photographic lens system being arranged to advance the lens system as a whole and, at the same time, to increase the airspace between the first and second lens groups when focusing on an object at a short distance from the state focused on an object at the infinite distance.

10 Claims, 33 Drawing Figures

ND APERTURE RATIO PHOTOGRAPHIC
LARGE APERTURE RATIO PHOTOGRAPHIC LENS SYSTEM

BACKGROUND OF THE INVENTION (a) Field of The Invention

The present invention relates to a large aperture ratio photographic lens system and, more particularly, to a large aperture ratio photographic lens system which enables to obtain high quality of image for an object at the infinite distance up to an object at an extremely short distance where the photographing magnification is ½ or more.

(b) Description of The Prior Art

Gauss type and modified Gauss type lens systems have high degree of freedom in correction of aberrations and are advantageous as large aperture ratio photographic lens systems. Besides, as the above-mentioned types of lens systems are symmetrical in the lens composition, they enable to reduce the variation of aberrations related to the variation of distance to the object, i.e., variation of magnification. However, when the lens system is arranged to have a large aperture ratio and extremely short distance photographing is carried out by that lens system, the quality of image becomes conspicuously unfavourable, and variation of aberrations becomes large at the magnification about 1/5 and higher.

As methods for preventing the variation of aberrations to be caused when the photographing magnification is varied, it is known to widen the airspace, where the stop is arranged, when the photographing magnification is made higher or to widen one of airspaces in rear of the stop at the same time as widening the above-mentioned airspace where the stop is arranged. Lens systems disclosed in Japanese published unexamined patent applications Nos. 46221/82, 8513/82, 107208/81, 192916/82 and 28038/80 are known as the lens system in which the above-mentioned methods are adopted.

However, to reduce the variation of spherical aberration to be caused when the airspace where the stop is arranged is widened as in cases of the above-mentioned methods, it is necessary to decide the refractive power of the lens group arranged in front of the stop so that paraxial rays, which come out from the lens group arranged in front of the stop, will not diverge so much even when the distance to the object becomes short.

On the other hand, when a Gauss type or modified Gauss type lens system is arranged to have a large aperture ratio and, at the same time, to have a satisfactorily long back focal length, there is a general tendency that the refractive power of the front lens group arranged in front of the stop becomes considerably weaker than the refractive power of the rear lens group arranged in rear of the stop. Besides, when arranging a lens system to have a large aperture ratio, it is difficult to correct aberrations unless thicknesses of respective lenses constituting the lens system, especially, thicknesses of respective lenses constituting the rear lens group are made large and, consequently, the back focal length necessarily becomes short. This means that, to obtain a satisfactorily long back focal length in the state to photograph an object at the infinite distance, the refractive power of the front lens group arranged in front of the stop should be made still weaker. Therefore, there is no known lens system put to practical use which has a large aperture ratio similar to ordinary standard type lens systems and, at the same time, enables to photograph an object at an extremely short distance.

SUMMARY OF THE INVENTION

It is, therefore, a primary object of the present invention to provide a large aperture ratio photographic lens system comprising a first lens group having positive refractive power, a second lens group having negative refractive power, and a third lens group having positive refractive power, and arranged to advance the lens system as a whole and, at the same time, to increase the airspace between the first and second lens groups when focusing on an object at a short distance, said large aperture ratio photographic lens system being thereby arranged that aberrations are corrected favourably over a wide photographing range from an object at the infinite distance up to an object at an extremely short distance where the photographing magnification is ½ or more.

Generally, in cases of Gauss type and modified Gauss type lens systems of which aberrations are corrected favourably for an object at the infinite distance or object at a distance where the photographing magnification is about 1/10, asymmetry of offaxial rays becomes unfavourable when the photographing magnification is made higher. In other words, the above-mentioned lens systems cause outer coma in most cases.

As the large aperture ratio photographic lens system accroding to the present invention is arranged to increase the airspace between the first and second lens groups, the entrance pupil which existed on the object side of the center of curvature of the first lens surface approaches the center of curvature of the first lens surface. As a result, incident angles of offaxial rays which enter the first lens surface become small, offaxial rays which come out from the first lens group become closer to parallel rays and, consequently, outer coma is corected.

On the other hand, as for spherical aberration, it is possible to maintain said aberration in favourable state by deciding the refractive power of the first lens group so that paraxial rays, which come out from the first lens group, become approximately parallel rays when photographing an object at a short distance and to thereby prevent the quality of image from becoming unfavourable. Besides, by deciding the refractive power of the second lens group adequately, it is possible to make the total refractive power of the lens groups arranged in front of the stop (the first and second lens groups) satisfactorily weak and to thereby obtain a satisfactorily long fack focal length.

When a lens system is to be used as a macro lens system, distortion thereof should be small. Generally, in cases of Gauss type and modified Gauss type lens systems, distortion varies toward "minus" direction when the lens system as a whole is advanced in order to focus the lens system on an object at a short distance. Therefore, it is necessary to correct distortion to be caused when the lens system is focused on an object at the infinite distance considerably toward "plus" direction.

The large aperture ratio photographic lens system according to the present inveniton is arranged that the positive lens group located in front of the stop (the first lens group) is moved away from the stop when focusing the lens system on an object at a short distance. As a result, distortion varies toward "plus" direction at that time. Therefore, correction of distortion becomes very easy, and it is possible to correct distortion without difficulty. Consequently, it is possible to correct other aberrations also easily.

To arrange that chromatic aberration does not vary even when the first lens group is moved at the time of focusing, chromatic aberration of the first lens group itself should be corrected favourably. Moreover, as the range of photographing magnification is wide, it is necessary to make aberrations of higher order small. For this purpose, it is necessary to arrange that the first lens group comprises a negative meniscus lens, which is convex toward the object side, and a positive lens.

Besides, as lateral chromatic aberration of the first and second lens groups only is corrected favourably, the third lens group is arranged that a cemented doublet, which consists of a positive lens and negative lens, or a negative lens is arranged on the image side therein.

It is possible to attain the primary object of the present invention by arranging that the lens system as a whole is advanced and, at the same time, the airspace between the first and second lens groups is increased as described so far. However, when the airspace where the stop is located, i.e., the airspace between the second and third lens groups, is varied according as the photographing magnification is varied, it is possible to further improve the quality of image.

When the lens system is focused only by advancing the lens system as a whole, aggravation of aberrations becomes conspicuous at the photographing magnification about 1/5. However, as a matter of fact, the quality of image is aggravated even at the photographing magnifications 1/30 and 1/10 compared with the quality of image for an object at the infinite distance. It is possible to correct the above-mentioned aggravation of quality of image by increasing the airspace between the first and second lens groups as described before. Besides, to correct curvature of image etc. at the same time as coma etc. at the photographing magnifications from 1/10 to 1/5, it is effective to vary the airspace where the stop exists by balancing with the variation of the airspace between the first and second lens groups. Especially, at the photographing magnifications from 1/10 to 1/5, rays from the object do not diverge at the position of the stop even when the refractive power of the lens groups arranged in front of the stop is weak as described before and, therefore, unfavourable influence on spherical aberration is not caused even when the airspace where the stop exists is varied.

For the large aperture ratio photographic lens system described so far, it is preferable to arrange that said lens system fulfills the conditions (1) through (4) shown below because the performance of the lens system is then improved further.

$$1.5 < \frac{f_I}{f} < 4 \quad (1)$$

$$2 < \frac{f_F}{f} < 9 \quad (2)$$

$$\nu_1 < 40 \quad (3)$$

$$\nu_L < 40 \quad (4)$$

In respective conditions shown in the above, reference symbol f represents the focal length of the lens system as a whole, reference symbol $f_I$ represents the focal length of the first lens gorup, reference symbol $f_F$ represents the total focal length of the lens groups arranged in front of the stop, reference symbol $\nu_1$ represents Abbe's number of the first lens component, and reference symbol $\nu_L$ represents Abbe's number of the rearmost negative lens element.

If $f_I/f$ defined by the condition (1) becomes larger than the upper limit thereof or smaller than the lower limit thereof, variation of spherical aberration becomes large when the lens system is focused on an object at a short distance.

If $f_F/f$ becomes smaller than the lower limit of the condition (2), the back focal length cannot be made long enough. If $f_F/f$ becomes larger than the upper limit of the condition (2), variation of lateral chromatic aberration becomes too large when the airspace where the stop exists is varied.

If $\nu_1$ becomes larger than the upper limit of the condition (3), variation of lateral chromatic aberration becomes too large when the photographing magnification is varied.

If $\nu_L$ becomes larger than the upper limit of the condition (4), it becomes difficult to correct lateral chromatic aberration.

DETAILED DESCRIPTION OF THE PREFERRED EMBODIMENTS

Figure 1:
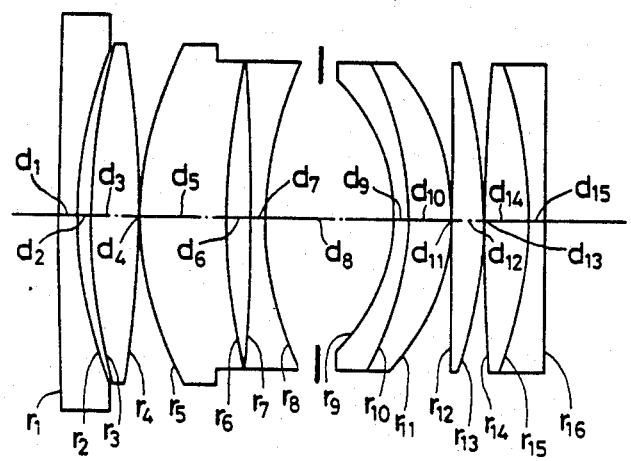
FIGS. 1 and 2 respectively show sectional views of Embodiment 1 of the large aperture ratio photographic lens system according to the present invention.

Now, preferred embodiments of the large aperture ratio photographic lens system described so far are shown below.

| Embodiment 1 | | | |
|---|---|---|---|
| $r_1 = 14.0333$ | | | |
| $d_1 = 0.0294$ | $n_1 = 1.60342$ | | $\nu_1 = 38.01$ |
| $r_2 = 0.6959$ | | | |
| $d_2 = 0.0196$ | | | |
| $r_3 = 1.0209$ | | | |
| $d_3 = 0.0784$ | $n_2 = 1.71300$ | | $\nu_2 = 53.84$ |
| $r_4 = -1.5891$ | | | |
| $d_4 = 0.0006$ | | | |
| $r_5 = 0.5483$ | | | |
| $d_5 = 0.1407$ | $n_3 = 1.78590$ | | $\nu_3 = 44.18$ |
| $r_6 = 1.0331$ | | | |
| $d_6 = 0.0395$ | | | |
| $r_7 = -3.4760$ | | | |
| $d_7 = 0.0235$ | $n_4 = 1.60562$ | | $\nu_4 = 43.72$ |
| $r_8 = 0.5679$ | | | |
| $d_8 = 0.2074$ | | | |
| $r_9 = -0.3035$ | | | |
| $d_9 = 0.0216$ | $n_5 = 1.60729$ | | $\nu_5 = 49.19$ |
| $r_{10} = -0.5006$ | | | |
| $d_{10} = 0.0726$ | $n_6 = 1.73520$ | | $\nu_6 = 41.08$ |
| $r_{11} = -0.3651$ | | | |
| $d_{11} = 0.0020$ | | | |
| $r_{12} = -11.4878$ | | | |
| $d_{12} = 0.0468$ | $n_7 = 1.72000$ | | $\nu_7 = 50.25$ |
| $r_{13} = -0.7911$ | | | |
| $d_{13} = 0.0020$ | | | |
| $r_{14} = 2.7684$ | | | |
| $d_{14} = 0.0725$ | $n_8 = 1.72000$ | | $\nu_8 = 50.25$ |
| $r_{15} = -0.7107$ | | | |
| $d_{15} = 0.0255$ | $n_9 = 1.80518$ | | $\nu_9 = 25.43$ |
| $r_{16} = -32.2084$ | | | |
| $f = 1,$ | F/2.0, | | $\omega = 22.8°$ |
| $f_I = 2.91,$ | | $f_F = 8.33$ | |
| $(\beta = 0.50)$ | | $d_4 = 0.116$ | |

| Embodiment 2 | | |
|---|---|---|
| $r_1 = 1.1356$ | | |
| $d_1 = 0.0396$ | $n_1 = 1.68893$ | $\nu_1 = 31.08$ |
| $r_2 = 0.7265$ | | |
| $d_2 = 0.0451$ | | |
| $r_3 = 3.1457$ | | |
| $d_3 = 0.0636$ | $n_2 = 1.71300$ | $\nu_2 = 53.84$ |
| $r_4 = -1.6344$ | | |
| $d_4 = 0.0031$ | | |
| $r_5 = 0.4659$ | | |
| $d_5 = 0.1467$ | $n_3 = 1.77250$ | $\nu_3 = 49.66$ |
| $r_6 = 1.0347$ | | |
| $d_6 = 0.0275$ | | |
| $r_7 = -5.9928$ | | |
| $d_7 = 0.0235$ | $n_4 = 1.58921$ | $\nu_4 = 41.08$ |
| $r_8 = 0.4357$ | | |
| $d_8 = 0.2013$ | | |
| $r_8 = -0.4482$ | | |
| $d_9 = 0.1291$ | $n_5 = 1.71285$ | $\nu_5 = 43.19$ |
| $r_{10} = -0.6286$ | | |
| $d_{10} = 0.0020$ | | |
| $r_{11} = -1.5158$ | | |
| $d_{11} = 0.0450$ | $n_6 = 1.72000$ | $\nu_6 = 43.70$ |
| $r_{12} = -0.5875$ | | |
| $d_{12} = 0.0020$ | | |
| $r_{13} = 1.8771$ | | |
| $d_{13} = 0.0817$ | $n_7 = 1.72916$ | $\nu_7 = 54.68$ |

-continued

| Embodiment 2 | | |
|---|---|---|
| $r_{14} = -0.6521$ | | |
| $d_{14} = 0.0255$ | $n_8 = 1.75520$ | $\nu_8 = 27.51$ |
| $r_{15} = -4.8988$ | | |
| $f = 1,$ | F/2.0, | $\omega = 22.8°$ |
| $f_I = 2.97,$ | | $f_F = 4.16$ |
| $(\beta = 0.50)$ | | $d_4 = 0.151$ |

| Embodiment 3 | | |
|---|---|---|
| $r_1 = 1.1032$ | | |
| $d_1 = 0.0393$ | $n_1 = 1.68893$ | $\nu_1 = 31.08$ |
| $r_2 = 0.7024$ | | |
| $d_2 = 0.0448$ | | |
| $r_3 = 3.2065$ | | |
| $d_3 = 0.0630$ | $n_2 = 1.71300$ | $\nu_2 = 53.84$ |
| $r_4 = -1.6032$ | | |
| $d_4 = 0.0031$ | | |
| $r_5 = 0.4280$ | | |
| $d_5 = 0.1259$ | $n_3 = 1.77250$ | $\nu_3 = 49.66$ |
| $r_6 = 0.9913$ | | |
| $d_6 = 0.0276$ | | |
| $r_7 = -20.4265$ | | |
| $d_7 = 0.0228$ | $n_4 = 1.58144$ | $\nu_4 = 40.75$ |
| $r_8 = 0.3847$ | | |
| $d_8 = 0.2045$ | | |
| $r_9 = -0.4530$ | | |
| $d_9 = 0.0214$ | $n_5 = 1.68250$ | $\nu_5 = 44.65$ |
| $r_{10} = 1.7560$ | | |
| $d_{10} = 0.1066$ | $n_6 = 1.72000$ | $\nu_6 = 41.98$ |
| $r_{11} = -0.6318$ | | |
| $d_{11} = 0.0019$ | | |
| $r_{12} = -1.2667$ | | |
| $d_{12} = 0.0437$ | $n_7 = 1.77250$ | $\nu_7 = 49.66$ |
| $r_{13} = -0.6228$ | | |
| $d_{13} = 0.0019$ | | |
| $r_{14} = 2.9120$ | | |
| $d_{14} = 0.0763$ | $n_8 = 1.77250$ | $\nu_8 = 49.66$ |
| $r_{15} = -0.5707$ | | |
| $d_{15} = 0.0253$ | $n_9 = 1.75520$ | $\nu_9 = 27.51$ |
| $r_{16} = -3.3913$ | | |
| $f = 1,$ | F/2.0, | $\omega = 22.8°$ |
| $f_I = 3.05,$ | $f_F = 3.88$ | |
| $(\beta = 0.10)$ | $d_4 = 0.026$ | $d_8 = 0.2061$ |
| $(\beta = 0.51)$ | $d_4 = 0.154$ | $d_8 = 0.2045$ |

| Embodiment 4 | | |
|---|---|---|
| $r_1 = 1.1102$ | | |
| $d_1 = 0.0396$ | $n_1 = 1.68893$ | $\nu_1 = 31.08$ |
| $r_2 = 0.7068$ | | |
| $d_2 = 0.0450$ | | |
| $r_3 = 3.2268$ | | |
| $d_3 = 0.0634$ | $n_2 = 1.71300$ | $\nu_2 = 53.84$ |
| $r_4 = -1.6134$ | | |
| $d_4 = 0.0031$ | | |
| $r_5 = 0.4640$ | | |
| $d_5 = 0.1480$ | $n_3 = 1.77250$ | $\nu_3 = 49.66$ |
| $r_6 = 1.0230$ | | |
| $d_6 = 0.0274$ | | |
| $r_7 = -6.5917$ | | |
| $d_7 = 0.0235$ | $n_4 = 1.58921$ | $\nu_4 = 41.08$ |
| $r_8 = 0.4300$ | | |
| $d_8 = 0.2134$ | | |
| $r_9 = -0.4558$ | | |
| $d_9 = 0.0215$ | $n_5 = 1.68250$ | $\nu_5 = 44.65$ |
| $r_{10} = 1.7661$ | | |
| $d_{10} = 0.1073$ | $n_6 = 1.72000$ | $\nu_6 = 41.98$ |
| $r_{11} = -0.6363$ | | |
| $d_{11} = 0.0020$ | | |
| $r_{12} = -1.3843$ | | |
| $d_{12} = 0.0446$ | $n_7 = 1.72000$ | $\nu_7 = 43.70$ |
| $r_{13} = -0.6025$ | | |
| $d_{13} = 0.0020$ | | |
| $r_{14} = 2.1499$ | | |
| $d_{14} = 0.0775$ | $n_8 = 1.72916$ | $\nu_8 = 54.68$ |
| $r_{15} = -0.5743$ | | |

-continued

Embodiment 4

| | | |
|---|---|---|
| $d_{15} = 0.0255$ | $n_9 = 1.75520$ | $\nu_9 = 27.51$ |
| $r_{16} = -3.4128$ | | |
| $f = 1$, | F/2.0, | $\omega = 22.8°$ |
| $f_I = 3.07$ | | $f_F = 4.48$ |
| $(\beta = 0.50)$ | | $d_4 = 0.151$ |

Embodiment 5

| | | |
|---|---|---|
| $r_1 = 0.9538$ | | |
| $d_1 = 0.0393$ | $n_1 = 1.68893$ | $\nu_1 = 31.08$ |
| $r_2 = 0.6422$ | | |
| $d_2 = 0.0447$ | | |
| $r_3 = 7.2925$ | | |
| $d_3 = 0.0630$ | $n_2 = 1.71300$ | $\nu_2 = 53.84$ |
| $r_4 = -1.4902$ | | |
| $d_4 = 0.0019$ | | |
| $r_5 = 0.4926$ | | |
| $d_5 = 0.1262$ | $n_3 = 1.77250$ | $\nu_3 = 49.66$ |
| $r_6 = 1.0040$ | | |
| $d_6 = 0.0276$ | | |
| $r_7 = -14.2218$ | | |
| $d_7 = 0.0220$ | $n_4 = 1.58144$ | $\nu_4 = 40.75$ |
| $r_8 = 0.5790$ | | |
| $d_8 = 0.2027$ | | |
| $r_9 = -0.3440$ | | |
| $d_9 = 0.0214$ | $n_5 = 1.68250$ | $\nu_5 = 44.65$ |
| $r_{10} = -0.7648$ | | |
| $d_{10} = 0.1066$ | $n_6 = 1.72000$ | $\nu_6 = 41.98$ |
| $r_{11} = -0.4948$ | | |
| $d_{11} = 0.0019$ | | |
| $r_{12} = -0.8132$ | | |
| $d_{12} = 0.0441$ | $n_7 = 1.77250$ | $\nu_7 = 49.66$ |
| $r_{13} = -0.4937$ | | |
| $d_{13} = 0.0019$ | | |
| $r_{14} = 2.0835$ | | |
| $d_{14} = 0.0778$ | $n_8 = 1.77250$ | $\nu_8 = 49.66$ |
| $r_{15} = -0.6346$ | | |
| $d_{15} = 0.0097$ | | |
| $r_{16} = -0.5772$ | | |
| $d_{16} = 0.0253$ | $n_9 = 1.75520$ | $\nu_9 = 27.51$ |
| $r_{17} = -3.3894$ | | |
| $f = 1$, | F/2.0, | $\omega = 22.8°$ |
| $f_I = 4.05$, | | $f_F = 3.53$ |
| $(\beta = 0.50)$ | | $d_4 = 0.110$ |

Embodiment 6

| | | |
|---|---|---|
| $r_1 = 1.2060$ | | |
| $d_1 = 0.0278$ | $n_1 = 1.60342$ | $\nu_1 = 38.01$ |
| $r_2 = 0.5894$ | | |
| $d_2 = 0.0402$ | | |
| $r_3 = 1.8201$ | | |
| $d_3 = 0.0676$ | $n_2 = 1.72916$ | $\nu_2 = 54.68$ |
| $r_4 = -1.7383$ | | |
| $d_4 = 0.0024$ | | |
| $r_5 = 0.4099$ | | |
| $d_5 = 0.1216$ | $n_3 = 1.77250$ | $\nu_3 = 49.66$ |
| $r_6 = 0.7540$ | | |
| $d_6 = 0.0304$ | | |
| $r_7 = 4.9772$ | | |
| $d_7 = 0.0233$ | $n_4 = 1.58144$ | $\nu_4 = 40.75$ |
| $r_8 = 0.3856$ | | |
| $d_8 = 0.2032$ | | |
| $r_9 = -0.4730$ | | |
| $d_9 = 0.0216$ | $n_5 = 1.68250$ | $\nu_5 = 44.65$ |
| $r_{10} = 4.6709$ | | |
| $d_{10} = 0.0929$ | $n_6 = 1.72000$ | $\nu_6 = 46.03$ |
| $r_{11} = -0.7102$ | | |
| $d_{11} = 0.0020$ | | |
| $r_{12} = -1.6505$ | | |
| $d_{12} = 0.0573$ | $n_7 = 1.77250$ | $\nu_7 = 49.66$ |
| $r_{13} = -0.5942$ | | |
| $d_{13} = 0.0020$ | | |
| $r_{14} = 3.5444$ | | |
| $d_{14} = 0.0845$ | $n_8 = 1.77250$ | $\nu_8 = 49.66$ |
| $r_{15} = -0.6641$ | | |

-continued

Embodiment 6

| | | |
|---|---|---|
| $d_{15} = 0.0255$ | $n_9 = 1.75520$ | $\nu_9 = 27.51$ |
| $r_{16} = -4.3126$ | | |
| $f = 1$, | F/2.0, | $\omega = 22.8°$ |
| $f_I = 3.15$, | | $f_F = 4.22$ |
| $(\beta = 0.50)$ | | $d_4 = 0.0802$ |

In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 2:
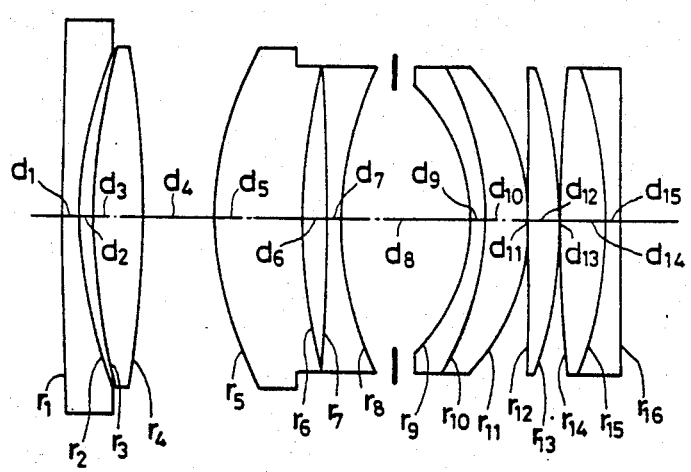
Figure 3:
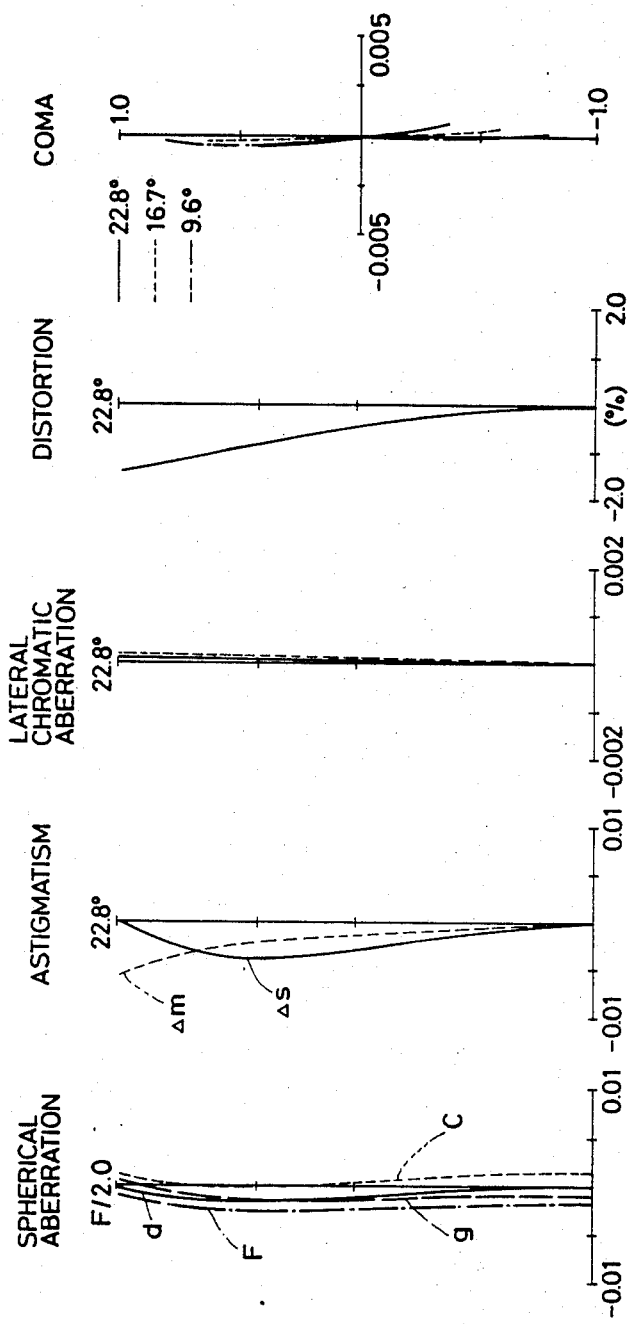
FIGS. 3 and 4 respectively show graphs illustrating aberration curves of Embodiment 1 of the present invention.
Figure 4:
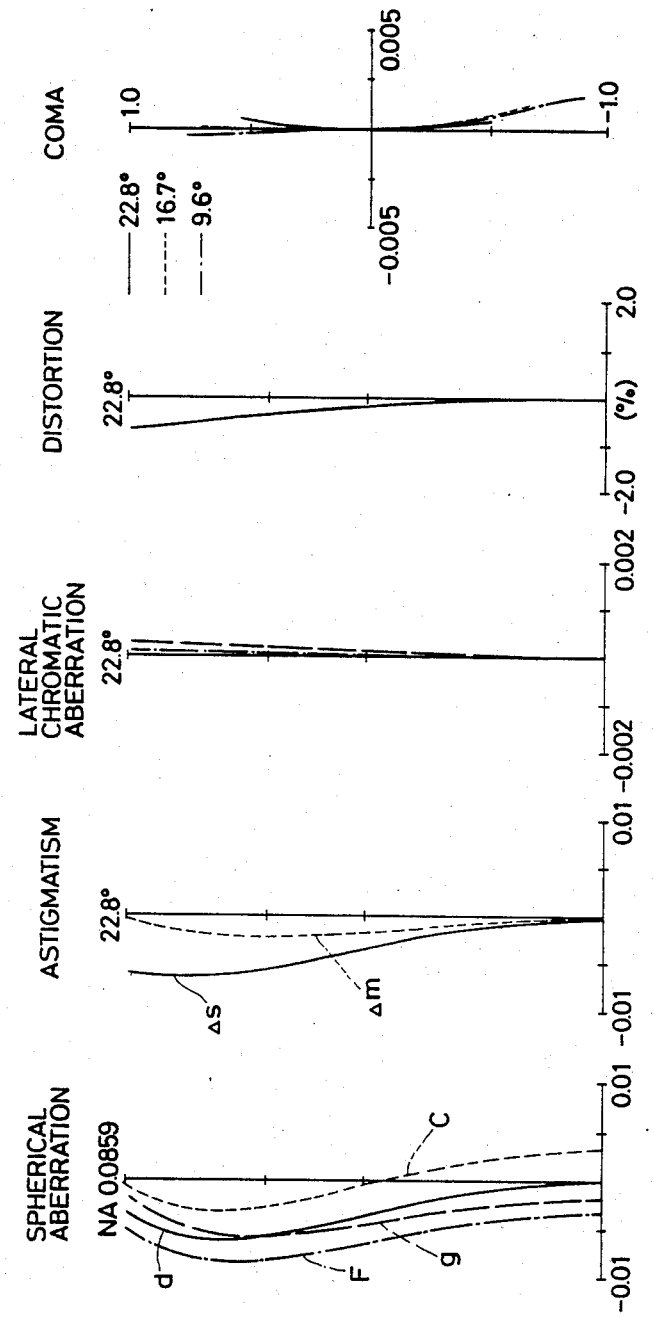
Figure 5:
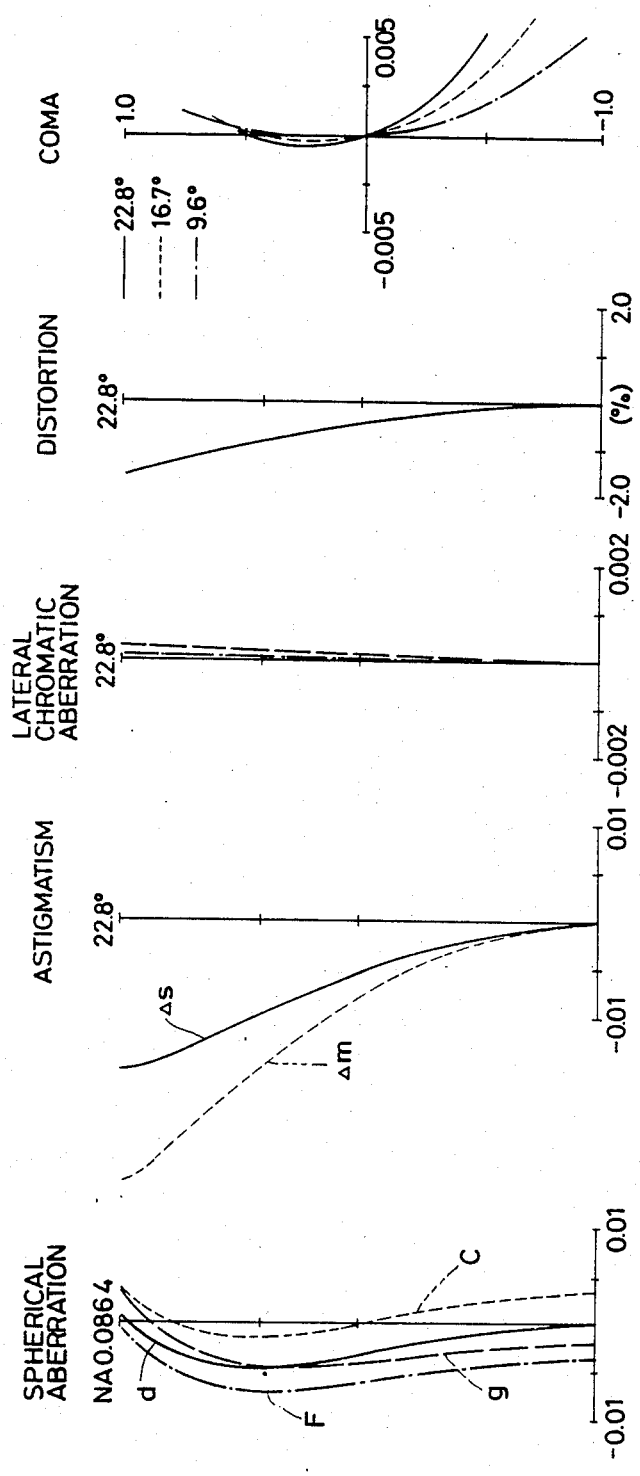
FIG. 5 shows graphs illustrating aberration curves when a lens system same as Embodiment 1 is focused only by advancing the lens system as a whole.

Out of respective embodiments shown in the above, Embodiment 1 has the lens configuration shown in FIGS. 1 and 2 where the third lens group comprises a cemented menisucs doublet, a single lens, and a cemented doublet consisting of a positive lens element and a negative lens element and arranged in the rearmost position. Out of FIGS. 1 and 2, FIG. 1 shows the lens system according to Embodiment 1 in the state that it is focused on an object at the infinite distance, and FIG. 2 shown said lens system in the state that it is focused on an object at an extremely short distance by largely advancing the first lens group. Aberration curves of Embodiment 1 are as shown in FIGS. 3 and 4. Out of them, FIG. 3 shows graphs of aberration curves when Embodiment 1 is focused on an object at the infinite distance, and FIG. 4 shows graphs of aberration curves when Embodiment 1 is focused on an object at an extremely short distance. Besides, FIG. 5 shows graphs of aberration curves when a lens system same as Embodiment 1 is focused only by advancing the lens system as a whole.

Figure 6:
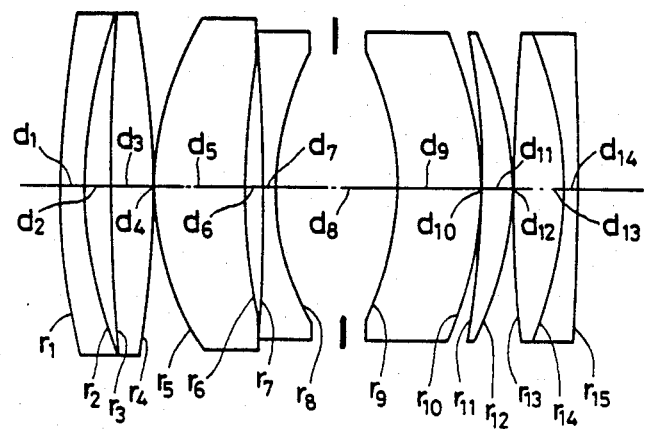
FIGS. 6 and 7 respectively show sectional views of Embodiment 2 of the present invention.
Figure 7:
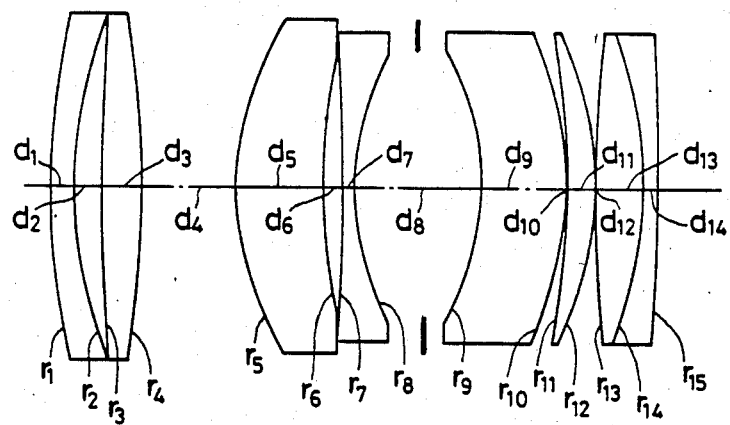
Figure 8:
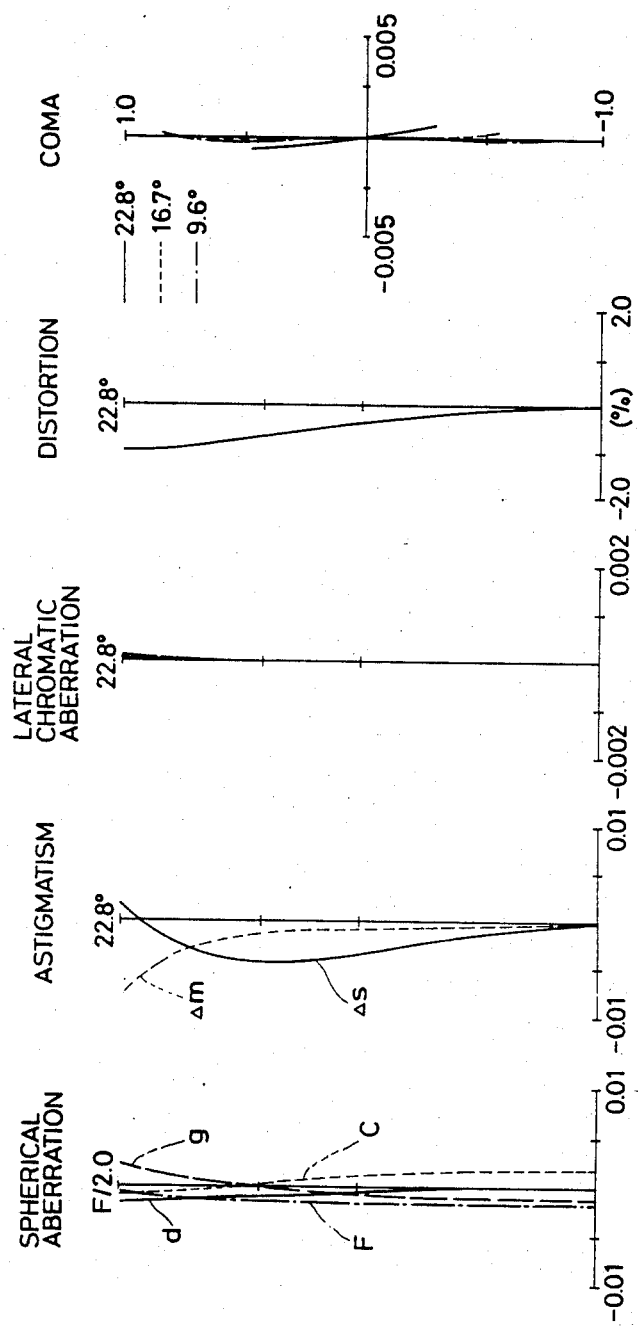
FIGS. 8 and 9 respectively shown graphs illustrating aberration curves of Embodiment 2 of the present invention.
Figure 9:
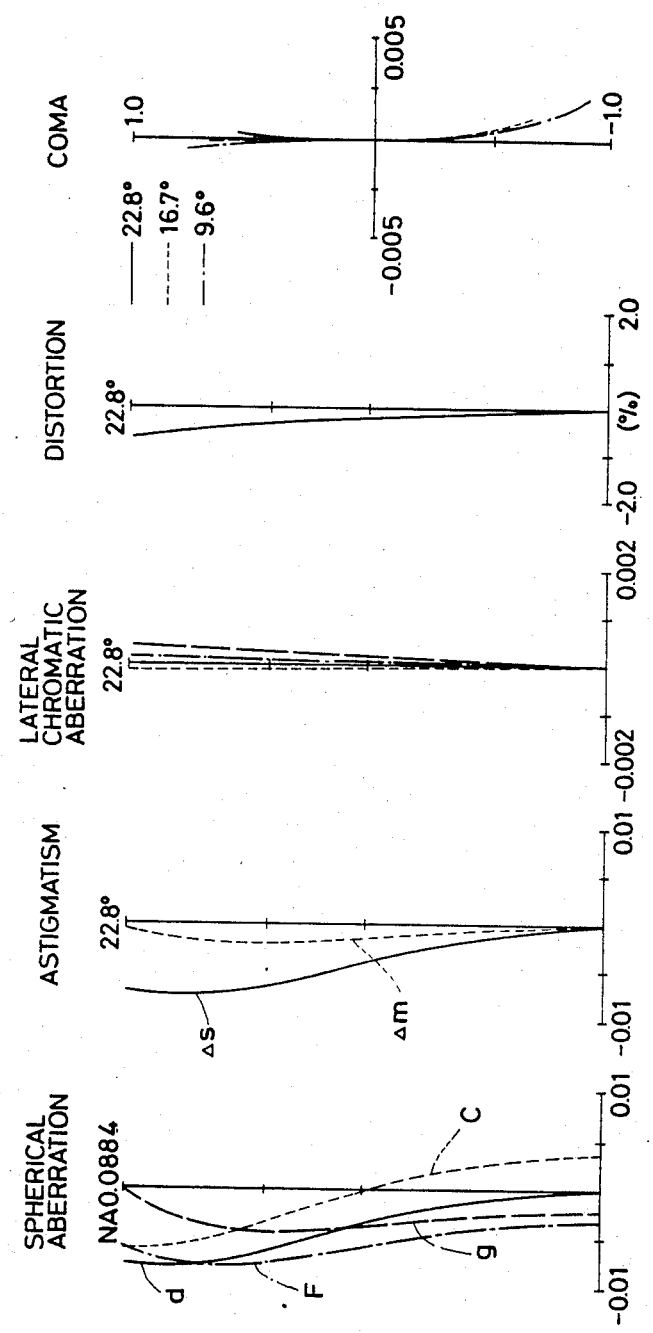
Figure 10:
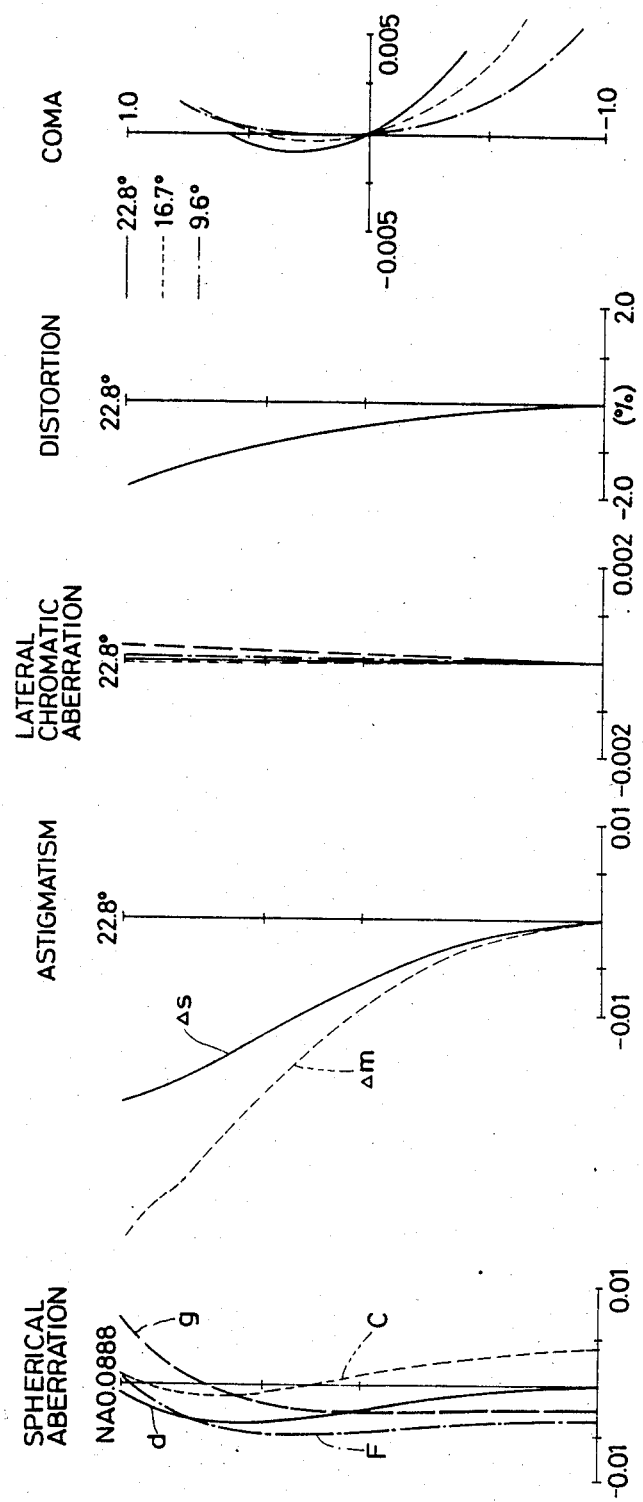
FIG. 10 shows graphs illustrating aberration curves when a lens system same as Embodiment 2 is focused only by advancing the lens system as a whole.

Embodiment 2 has the lens configuration shown in FIGS. 6 and 7 where the third lens group comprises two meniscus single lenses and a cemented doublet consisting of a positive lens element and a negative lens element and is arranged in the rear most position. Out of FIGS. 6 and 7, FIG. 6 shows the lens system according to Embodiment 2 in the state that it is focused on an object at the infinite distance, and FIG. 7 shows said lens system in the state that it is focused on an object at an extremely short distance. FIG. 8 show graphs of aberration curves of Embodiment 2 when it is focused on an object at the infinite distance, and FIG. 9 shows graphs of aberration curves of Embodiment 2 when it is focused on an object at an extremely short distance. Besides, FIG. 10 shows graphs of aberration curves when a lens system same as Embodiment 2 is focused only by advancing the lens system as a whole. In Embodiment 2, the lens component on the object side in the third lens group is arranged as a shingle lens. However, chromatic aberration is corrected favourably to the degree that it does not cause any problem in practical use.

Figure 11:
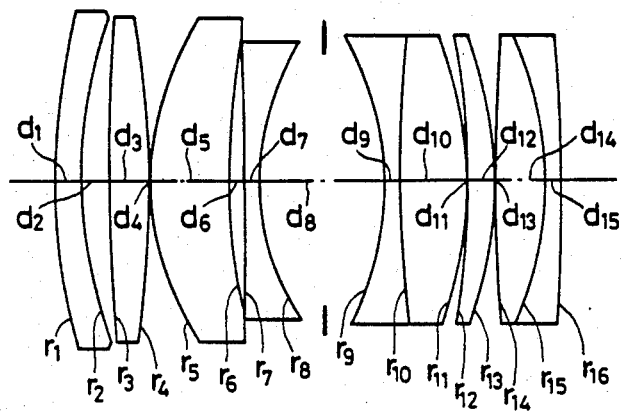
FIGS. 11 through 13 respectively show sectional views of Embodiment 3 of the present invention.
Figure 12:
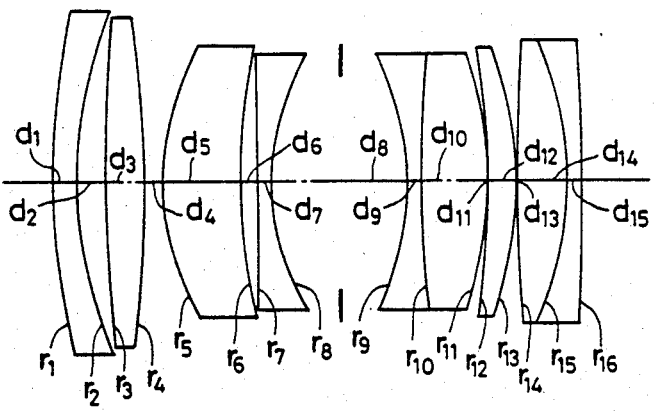
Figure 13:
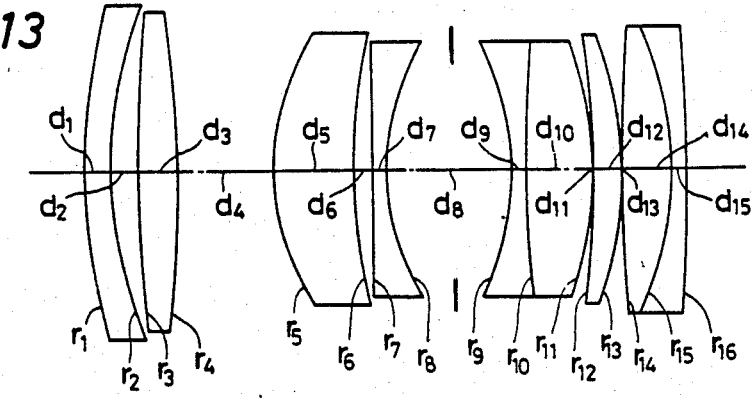
Figure 14:
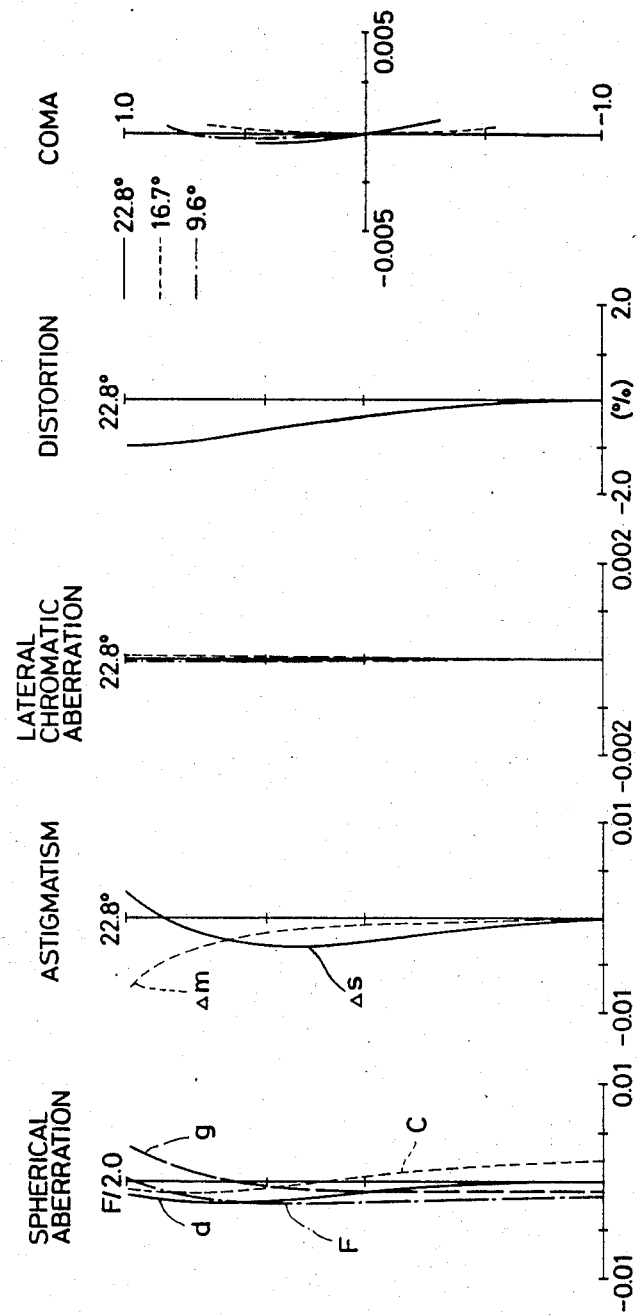
FIGS. 14 through 16 respectively show graphs illustrating aberration curves of Embodiment 3 of the present invention.
Figure 15:
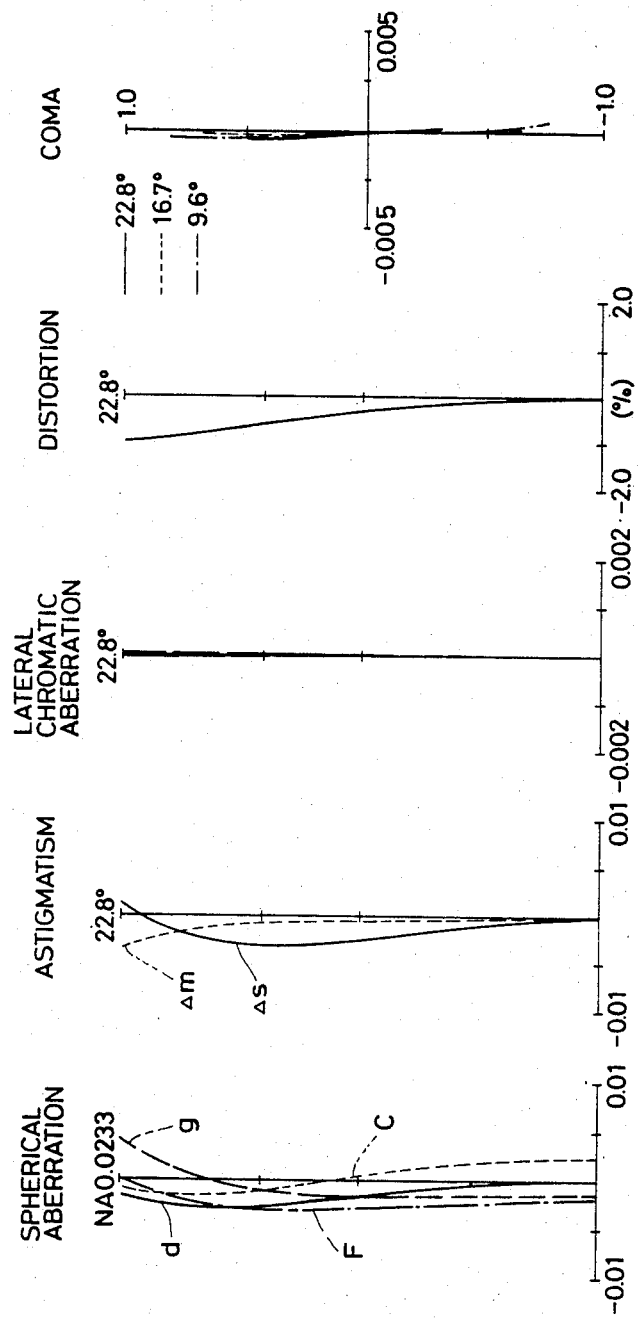
Figure 16:
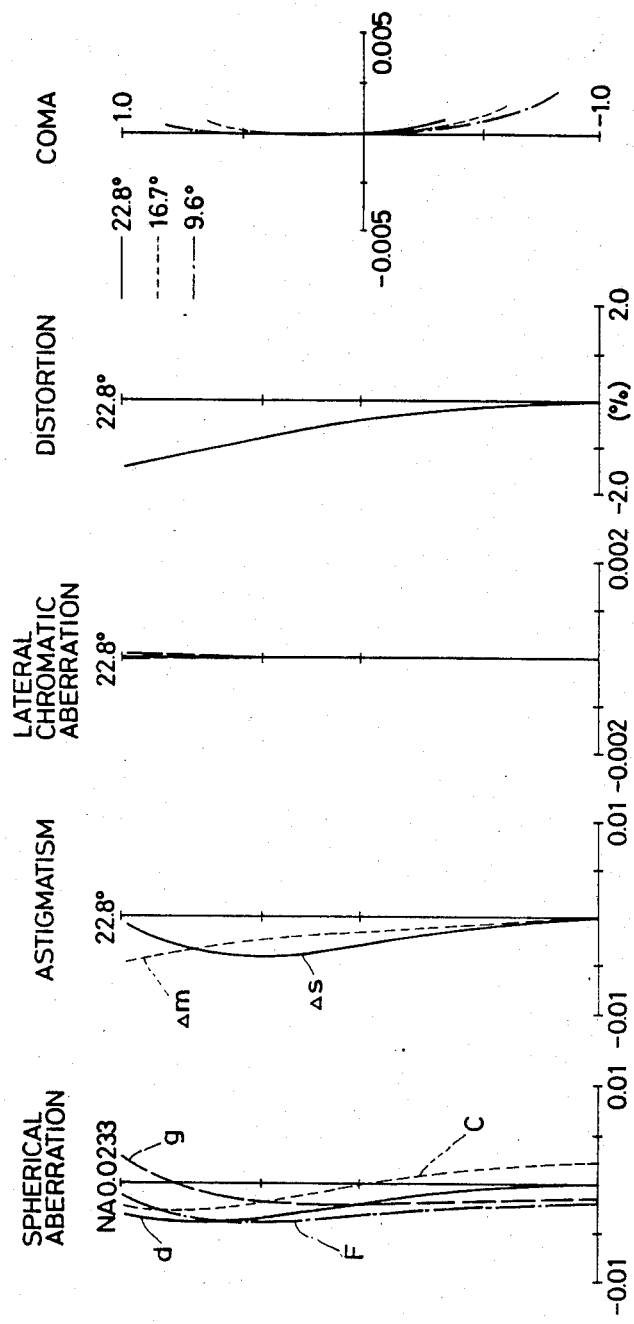
Figure 17:
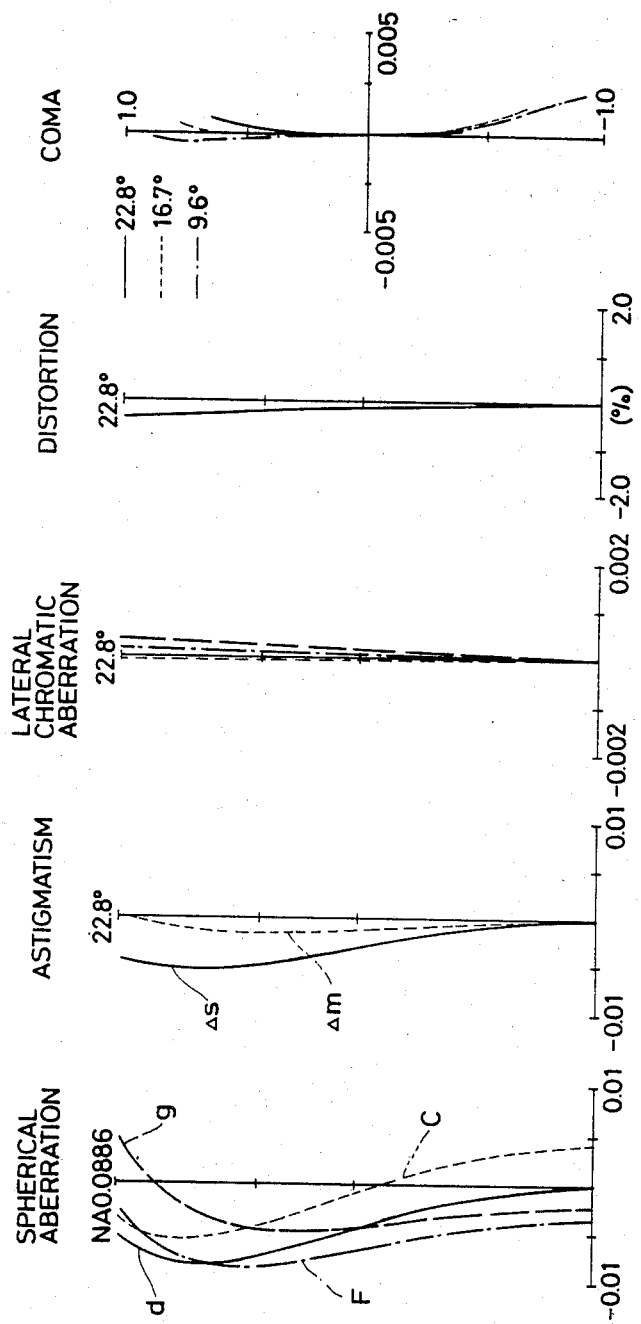
FIGS. 17 and 18 respectively show graphs illustrating aberration curves when a lens system same as Embodiment 3 is focused only by advancing the lens system as a whole.
Figure 18:
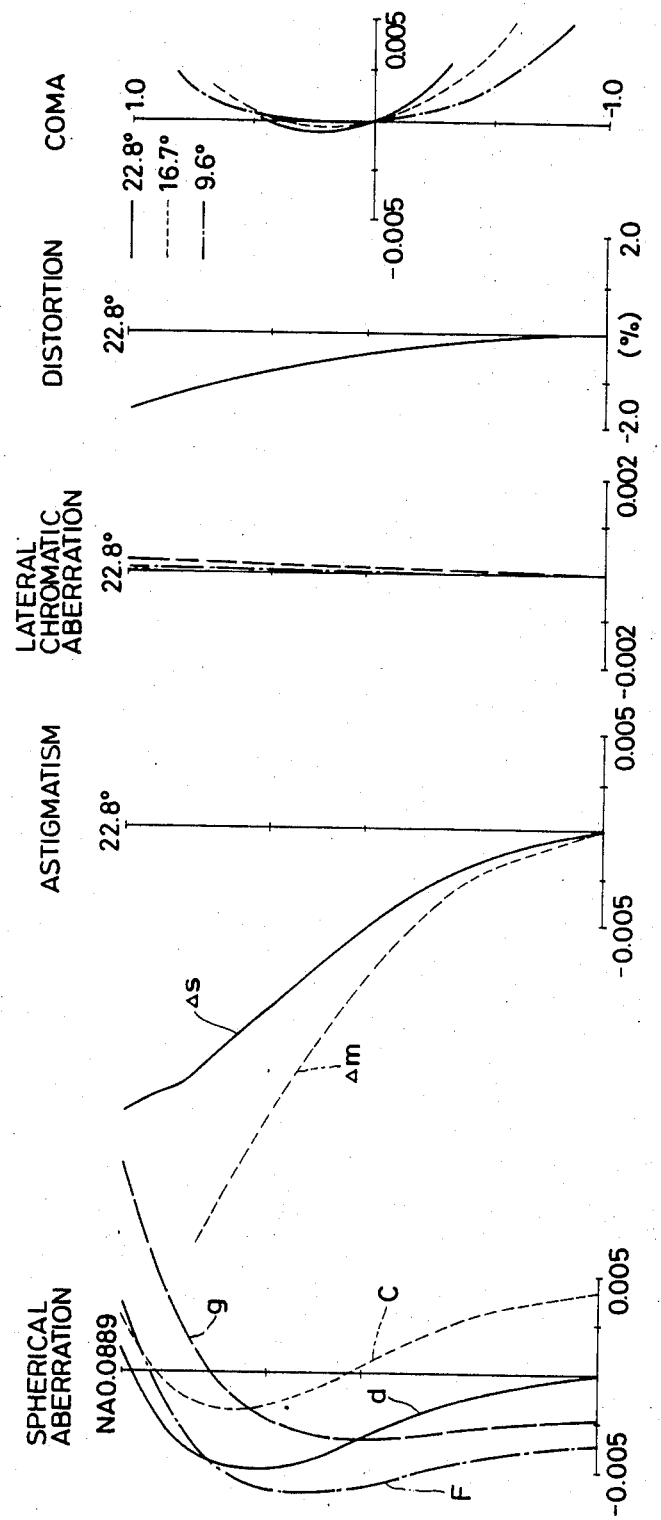

Embodiment 3 has the lens configuration shown in FIGS. 11 through 13. Embodiment 3 is arranged to vary the airspace between the second and third lens groups when photographing at intermediate photographing magnifications. FIG. 11 shows Embodiment 3 in the state that it is focused on an object at the infinite distance. FIG. 12 shows Embodiment 3 in the state that it is focused for photographing at an intermediate photographing magnification by increasing the airspace between the first and second lens groups and, at the same time, varying the airspace between the second and third lens groups. FIG. 13 shows Embodiment 3 in the state that it is focused on an object at an extremely short distance by further increasing the airspace between the first and second lens groups. FIGS. 14, 15 and 16 respectively show graphs of aberration curves of Embodiment 3 in resepctive states described in the above. Besides, FIGS. 17 and 18 respectively show graphs of aberration curves when a lens system same as Embodiment 3 is focused only by advancing the lens system as a whole for photographing at an intermediate photographing magnification and for photographing of an object at an extremely short distance.

Figure 19:
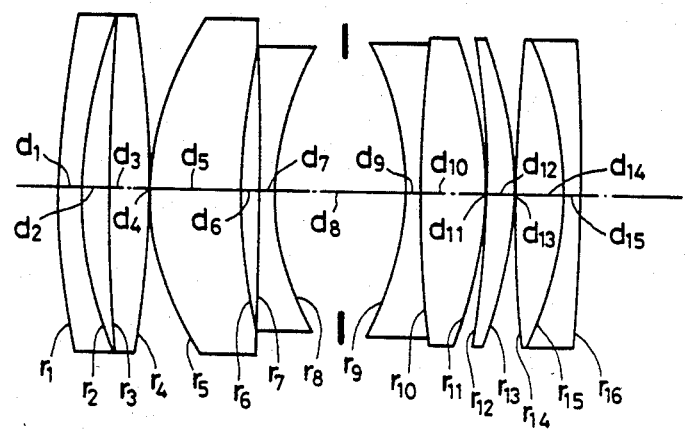
FIGS. 19 and 20 respectively show sectional views of Embodiment 4 of the present invention.
Figure 20:
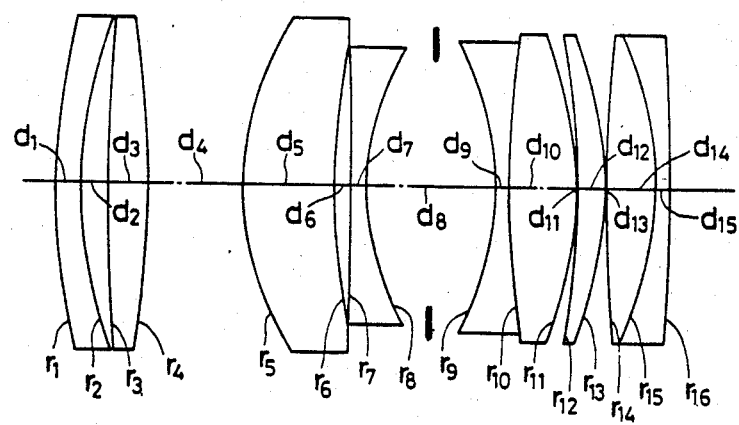
Figure 21:
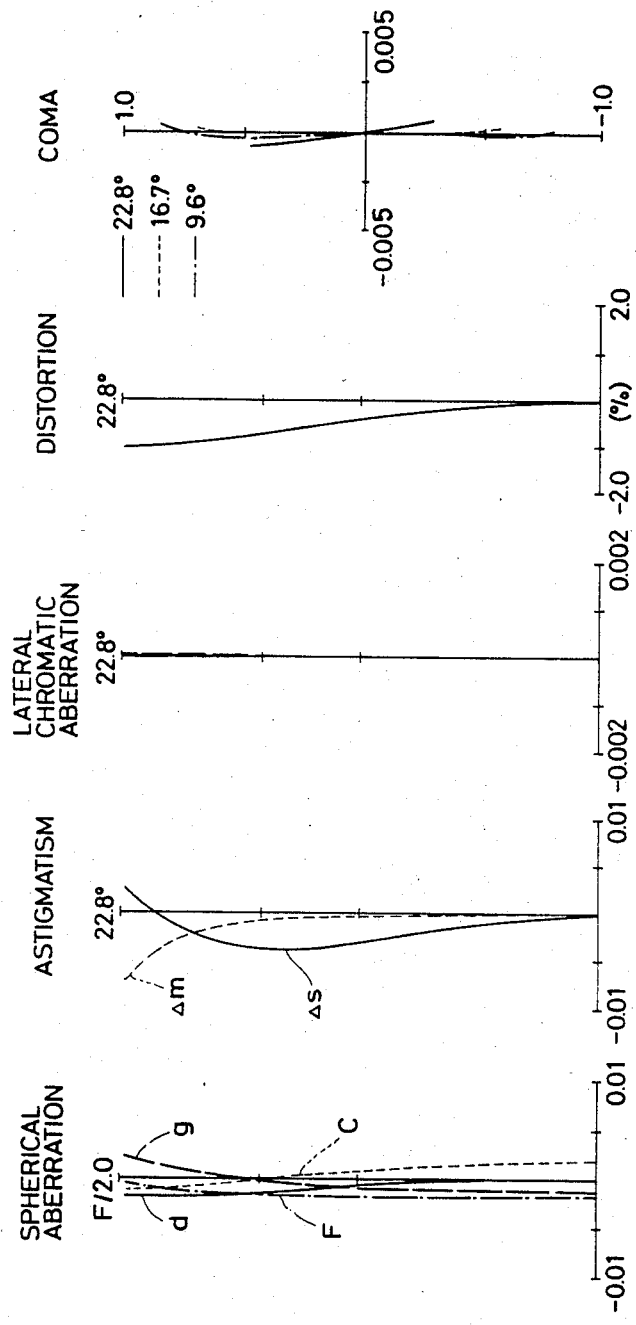
FIG. 21 and 22 respectively show graphs illustrating aberration curves of Embodiment 4 of the present invention.
Figure 22:
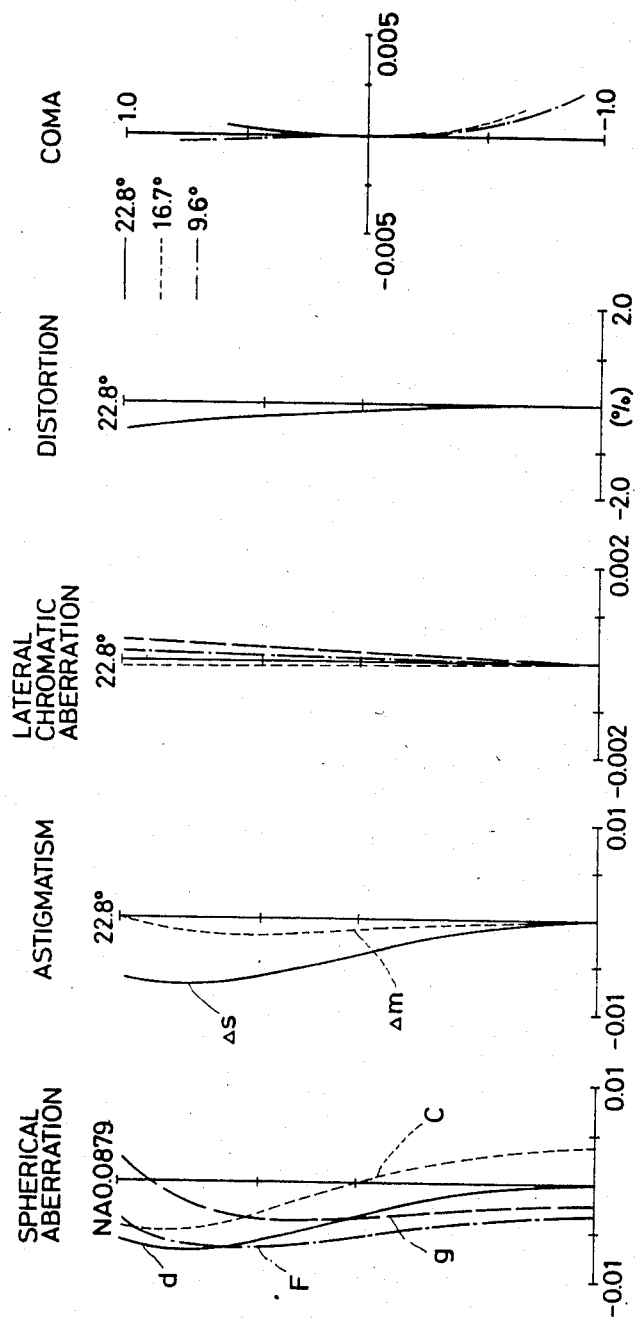
Figure 23:
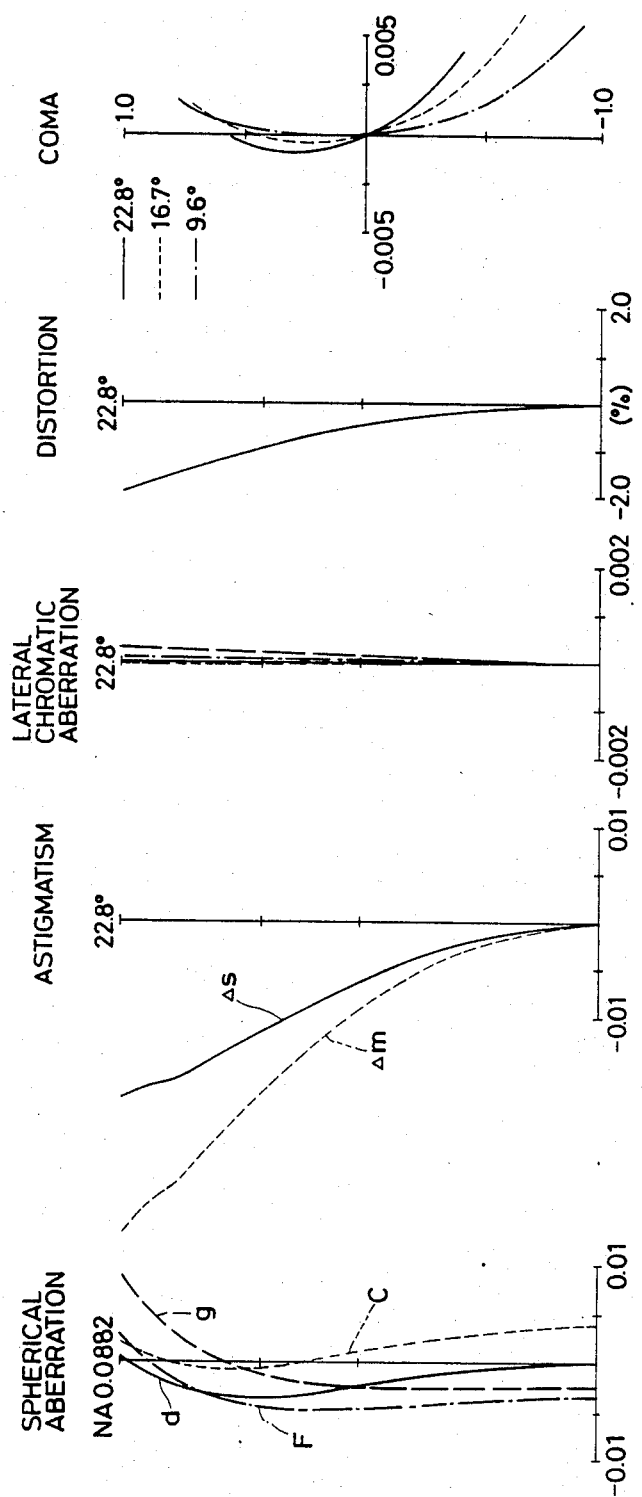
FIG. 23 shows graphs illustrating aberration curves when a lens system same as Embodiment 4 is focused only by advancing the lens system as a whole.

Embodiment 4 has the lens configuration shown in FIGS. 19 and 20. Out of them, FIG. 19 shows Embodiment 4 in the state that it is focused on an object at the infinite distance, and FIG. 20 shows Embodiment 4 in the state that it is focused on an object at an extremely short distance. FIGS. 21 and 22 respectively show graphs of aberration curves of Embodiment 4 in respective states described in the above. FIG. 23 shows graphs of aberration curves when a lens system same as Embodiment 4 is focused only by advancing the lens system as a whole.

Figure 24:
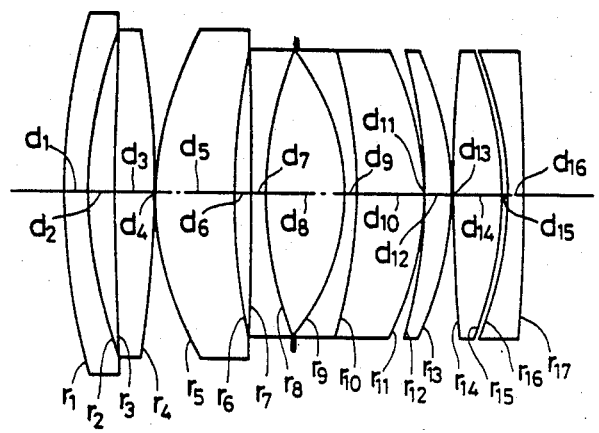
FIGS. 24 and 25 respectively show sectional views of Embodiment 5 of the present invention.
Figure 25:
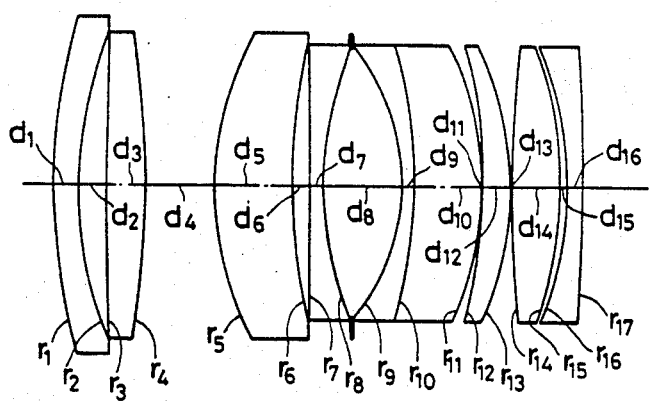
Figure 26:
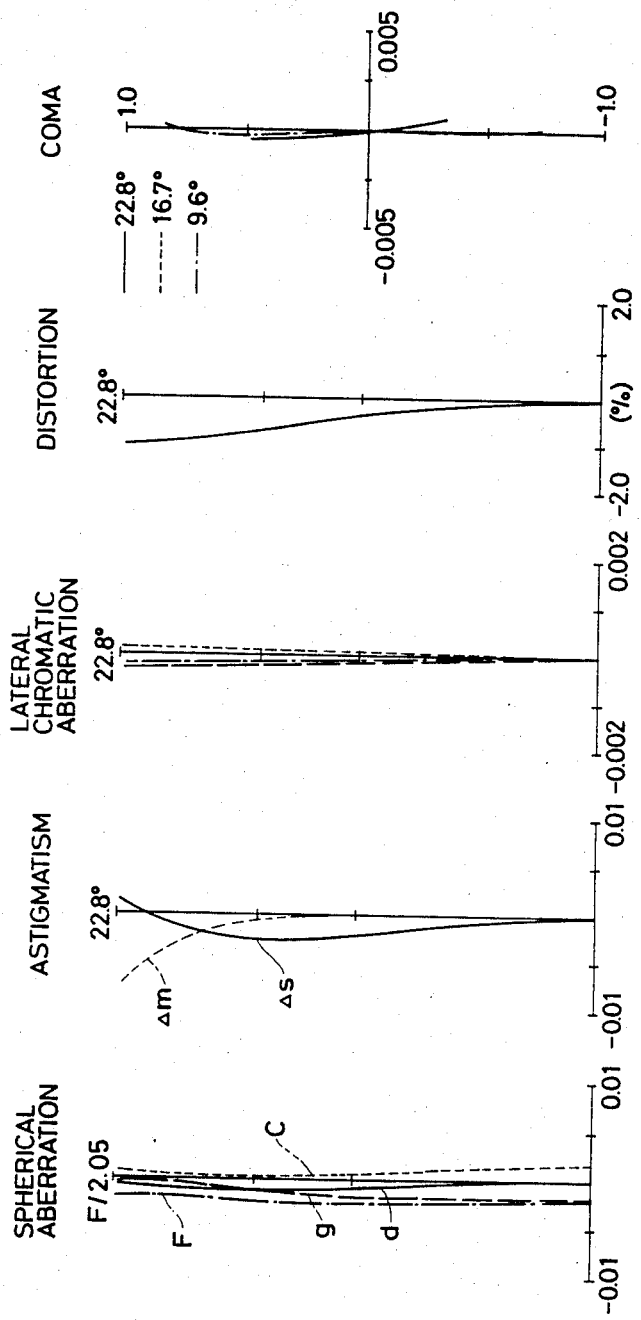
FIGS. 26 and 27 respectively show graphs illustrating aberration cauves of Embodiment 5 of the present invention.
Figure 27:
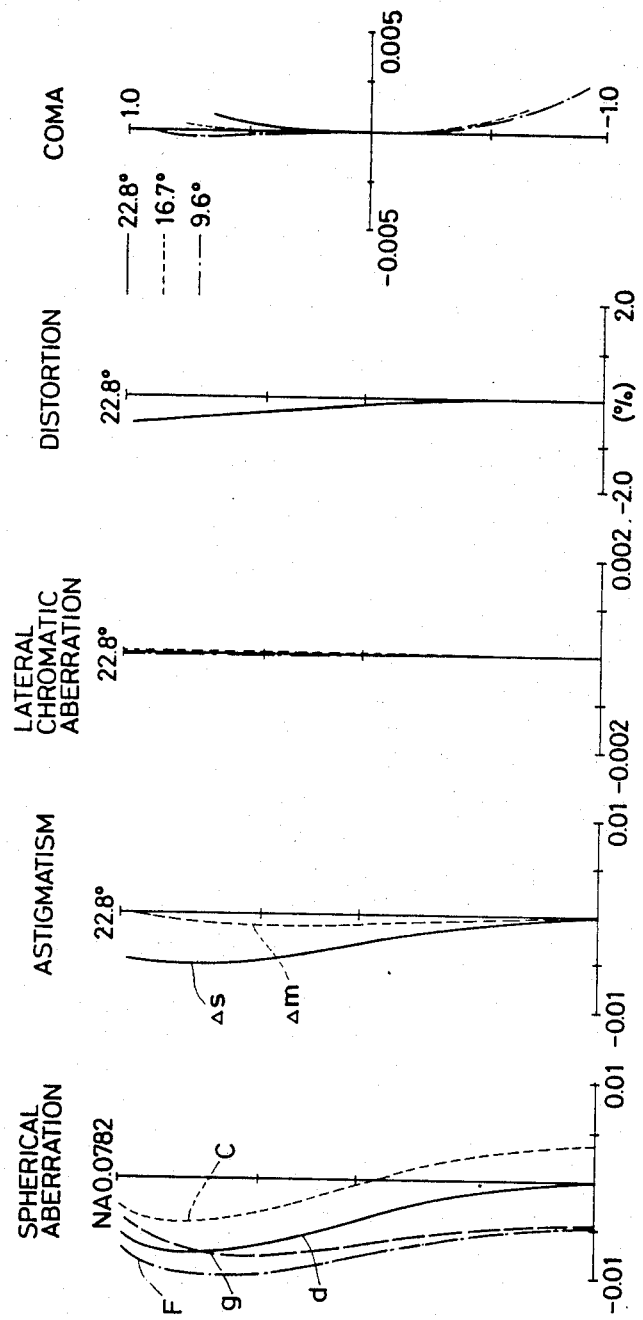
Figure 28:
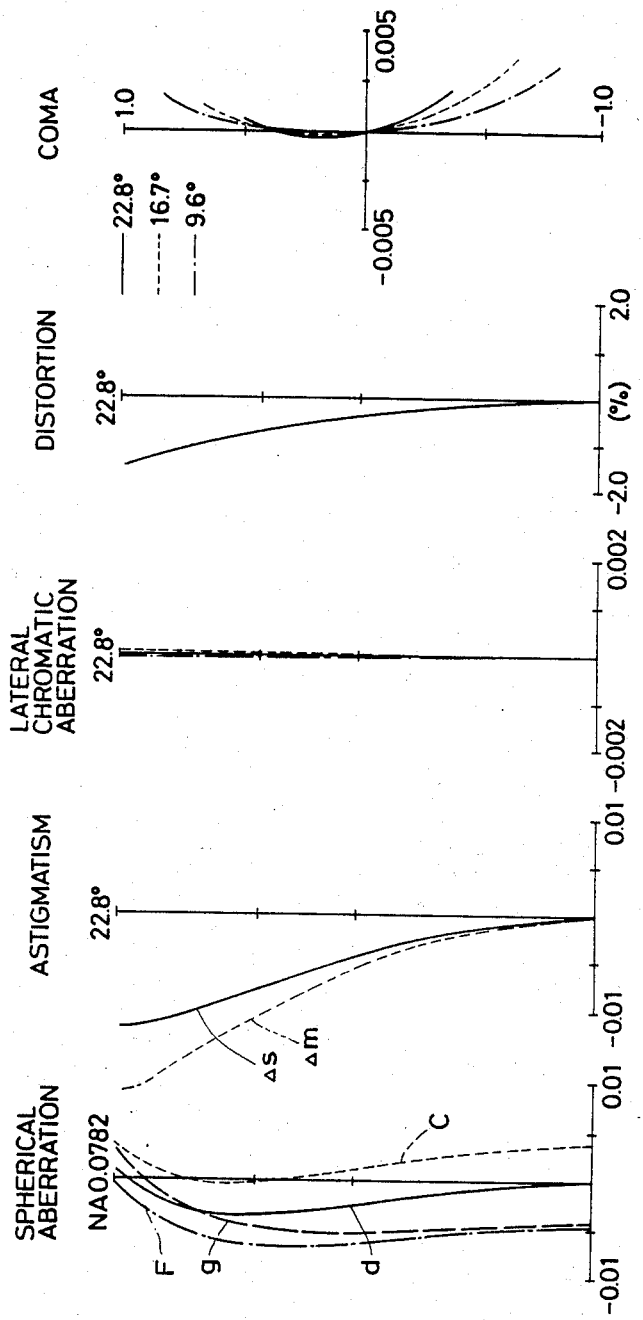
FIG. 28 shows graphs illustrating aberration curves when a lens system same as Embodiment 5 is focused only by advancing the lens system as a whole.

Embodiment 5 has the lens configuration shown in FIGS. 24 and 25 where the third lens group comprises a cemented meniscus doublet, a meniscus single lens, a positive single lens, and a negative single lens. Out of FIGS. 24 and 25, FIG. 24 shows Embodiment 5 in the state that it is focused on an object at the infinite distance, and FIG. 25 shows Embodiment 5 in the state that it is focused on an object at an extremely short distance. FIGS. 26 and 27 respectively show graphs of aberration curves of Embodiment 5 in respective states described in the above. FIG. 28 shows graphs of aberration curves when a lens system same as Embodiment 5 is focused only by advancing the lens system as a whole.

Figure 29:
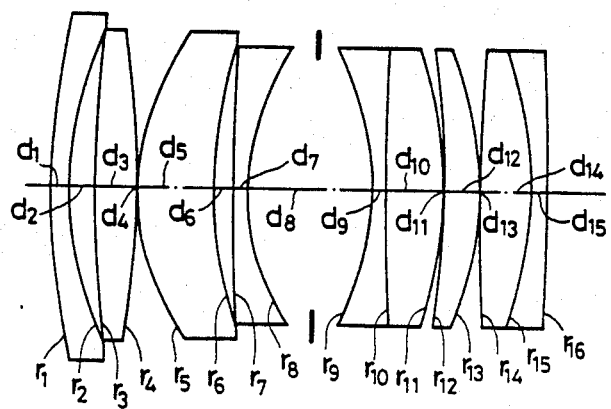
FIGS. 29 and 30 respectively show sectional views of Embodiment 6 of the present invention.
Figure 30:
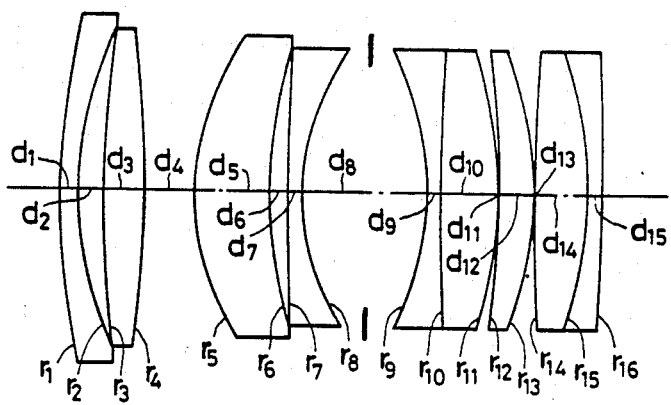
Figure 31:
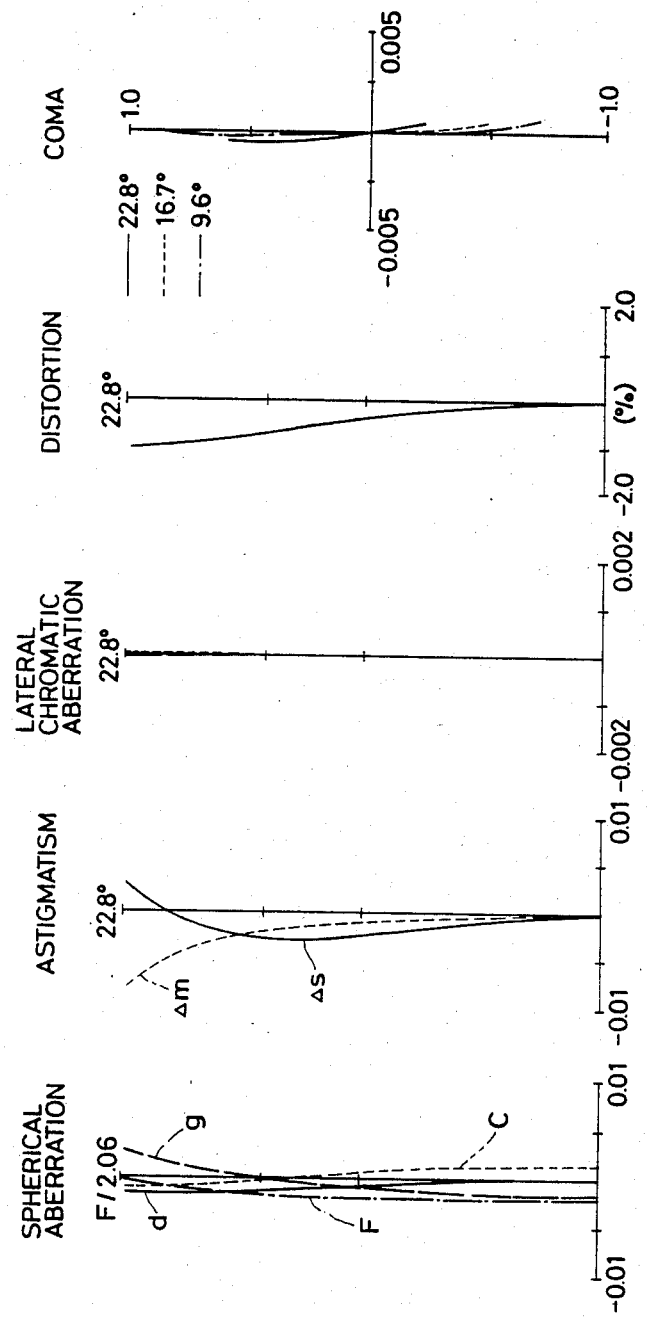
FIGS. 31 and 32 respectively show graphs illustrating aberration curves of Embodiment 6 of the present invention.
Figure 32:
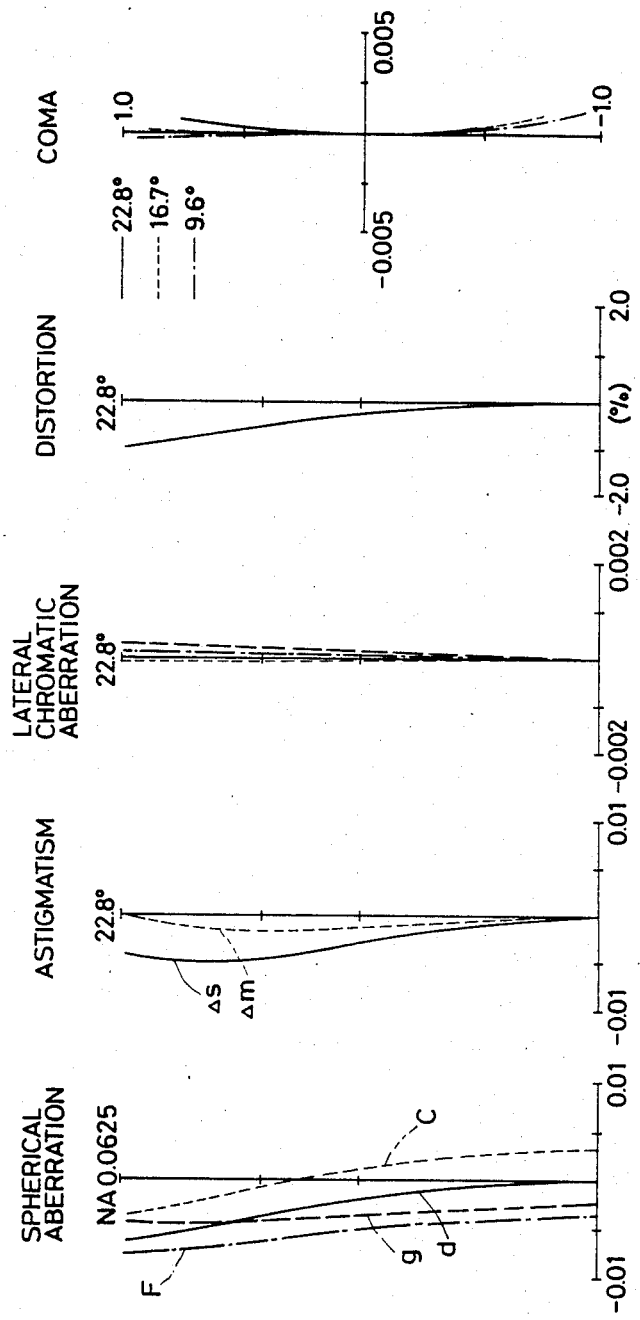
Figure 33:
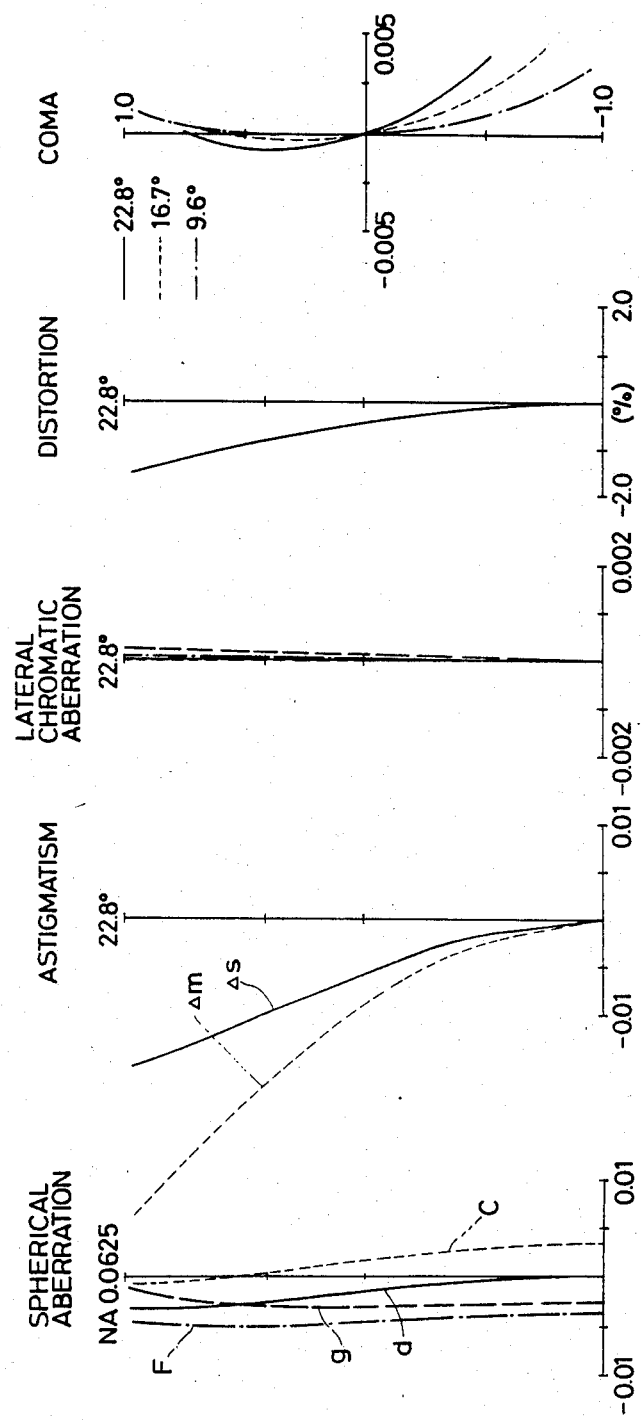
FIG. 33 shows graphs illustrating aberration curves when a lens system same as Embodiment 6 is focused only by advancing the lens system as a whole.

Embodiment 6 has the lens configuration shown in FIGS. 29 and 30 where the third lens group comprises a cemented meniscus doublet, a meniscus single lens, and a cemented doublet. Out of FIGS. 29 and 30, FIG. 29 shows Embodiment 6 in the state that it is focused on an object at the infinite distance, and FIG. 30 shows Embodiment 6 in the state that it is focused on an object at an extremely short distance. FIGS. 31 and 32 respectively show graphs of aberration curves of Emobidment 6 in respective states described in the above. FIG. 33 shows graphs of aberration curves when a lens system same as Embodiment 6 is focused only by advancing the lens system as a whole.

As it is evident from respective embodiments described so far, the photographic lens system according to the present invention has a large aperture ratio and, at the same time, it is arranged that variation of aberrations is small and aberrations are corrected favourably even in the state that it is focused on an object at an extremely short distance where aberrations become unfavourable when the focusing method only to advance the lens system as a whole is adopted.

I claim:

1. A large aperture ratio photographic lens system comprising a first lens group having positive refractive power, a second lens group having negative refractive power, a third lens group comprising a negative lens element arranged in the rearmost position and having positive refractive power, in the order from the object side, and a stop arranged between said second lens group and said third lens group, said large aperture ratio photographic lens system being arranged to advance the lens system as a whole and, at the same time, to increase the airspace between said first lens group and said second lens group when focusing said photographic lens system on an object at a short distance from the state that said photographic lens system is focused on an object at an infinite distance.

2. A large aperture ratio photographic lens system according to claim 1 wherein said first lens group comprises a negative meniscus lens arranged convex toward the object side and a positive lens, and said second lens group comprises a positive lens and a negative lens.

3. A large aperture ratio photographic lens system according to claim 2 which fulfills the conditions (1) through (4) shown below:

$$1.5 < \frac{f_I}{f} < 4 \quad (1)$$

$$2 < \frac{f_F}{f} < 9 \quad (2)$$

$$\nu_1 < 40 \quad (3)$$

$$\nu_L < 40 \quad (4)$$

where, reference symbol f represents the focal length of the lens system as a whole, reference symbol $f_I$ represents the focal length of the first lens group, reference symbol $f_F$ represents the total focal length of the first and second lens groups, reference symbol $\nu_1$ represents Abbe's number of the negative meniscus lens in the first lens group, and reference symbol $\nu_L$ represents Abbe's number of the negative lens element arrange in the rearmost position in the third lens group.

4. A large aperture ratio photographic lens system according to claim 1, 2 or 3 further arranged to vary the airspace betwen said second lens group and said third lens group when focusing said photographic lens system on an object at a short distance from the state that said photographic lens system is focused on an object at the infinite distance.

5. A large aperture ratio photographic lens system according to claim 3 wherein said third lens group comprises a cemented meniscus doublet consisting of a negative lens element and a positive lens element, a positive lens, and a cemented doublet consisting of a positive lens element and a negative lens element, said large aperture ratio photographic lens system having the following numerical data:

| | | |
|---|---|---|
| $r_1 = 14.0333$ | | |
| $d_1 = 0.0294$ | $n_1 = 1.60342$ | $\nu_1 = 38.01$ |
| $r_2 = 0.6959$ | | |
| $d_2 = 0.0196$ | | |
| $r_3 = 1.0209$ | | |
| $d_3 = 0.0784$ | $n_2 = 1.71300$ | $\nu_2 = 53.84$ |
| $r_4 = -1.5891$ | | |
| $d_4 = 0.0006$ | | |
| $r_5 = 0.5483$ | | |
| $d_5 = 0.1407$ | $n_3 = 1.78590$ | $\nu_3 = 44.18$ |
| $r_6 = 1.0331$ | | |
| $d_6 = 0.0395$ | | |
| $r_7 = -3.4760$ | | |
| $d_7 = 0.0235$ | $n_4 = 1.60562$ | $\nu_4 = 43.72$ |
| $r_8 = 0.5679$ | | |
| $d_8 = 0.2074$ | | |
| $r_9 = -0.3035$ | | |

-continued

| | | |
|---|---|---|
| $d_9 = 0.0216$ | $n_5 = 1.60729$ | $v_5 = 49.19$ |
| $r_{10} = -0.5006$ | | |
| $d_{10} = 0.0726$ | $n_6 = 1.73520$ | $v_6 = 41.08$ |
| $r_{11} = -0.3651$ | | |
| $d_{11} = 0.0020$ | | |
| $r_{12} = -11.4878$ | | |
| $d_{12} = 0.0468$ | $n_7 = 1.72000$ | $v_7 = 50.25$ |
| $r_{13} = -0.7911$ | | |
| $d_{13} = 0.0020$ | | |
| $r_{14} = 2.7684$ | | |
| $d_{14} = 0.0725$ | $n_8 = 1.72000$ | $v_8 = 50.25$ |
| $r_{15} = -0.7107$ | | |
| $d_{15} = 0.0255$ | $n_9 = 1.80518$ | $v_9 = 25.43$ |
| $r_{16} = -32.2084$ | | |
| $f = 1.$ | F/2.0. | $\omega = 22.8°$ |
| $f_I = 2.91$ | | $f_F = 8.33$ |
| $(\beta = 0.50)$ | | $d_4 = 0.116$ | where, reference symbols $r_1$ through $r_{16}$ respectively represents radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, and reference symbols $v_1$ through $v_9$ respectively represent Abbe's numbers of respective lenses.

6. A large aperture ratio photographic lens system according to claim 3 wherein said third lens group comprises a cemented meniscus doublet consisting of a negative lens element and a positive lens element, a positive lens, and a cemented doublet consisting of a positive lens element and a negative lens element, said large aperture ratio photographic lens system having the following numerical data:

| | | |
|---|---|---|
| $r_1 = 1.1032$ | | |
| $d_1 = 0.0393$ | $n_1 = 1.68893$ | $v_1 = 31.08$ |
| $r_2 = 0.7024$ | | |
| $d_2 = 0.0448$ | | |
| $r_3 = 3.2065$ | | |
| $d_3 = 0.0630$ | $n_2 = 1.71300$ | $v_2 = 53.84$ |
| $r_4 = -1.6032$ | | |
| $d_4 = 0.0031$ | | |
| $r_5 = 0.4280$ | | |
| $d_5 = 0.1259$ | $n_3 = 1.77250$ | $v_3 = 49.66$ |
| $r_6 = 0.9913$ | | |
| $d_6 = 0.0276$ | | |
| $r_7 = -20.4265$ | | |
| $d_7 = 0.0228$ | $n_4 = 1.58144$ | $v_4 = 40.75$ |
| $r_8 = 0.3847$ | | |
| $d_8 = 0.2045$ | | |
| $r_9 = -0.4530$ | | |
| $d_9 = 0.0214$ | $n_5 = 1.68250$ | $v_5 = 44.65$ |
| $r_{10} = 1.7560$ | | |
| $d_{10} = 0.1066$ | $n_6 = 1.72000$ | $v_6 = 41.98$ |
| $r_{11} = -0.6318$ | | |
| $d_{11} = 0.0019$ | | |
| $r_{12} = -1.2667$ | | |
| $d_{12} = 0.0437$ | $n_7 = 1.77250$ | $v_7 = 49.66$ |
| $r_{13} = -0.6228$ | | |
| $d_{13} = 0.0019$ | | |
| $r_{14} = 2.9120$ | | |
| $d_{14} = 0.0763$ | $n_8 = 1.77250$ | $v_8 = 49.66$ |
| $r_{15} = -0.5707$ | | |
| $d_{15} = 0.0253$ | $n_9 = 1.75520$ | $v_9 = 27.51$ |
| $r_{16} = -3.3913$ | | |
| $f = 1.$ | F/1.0. | $\omega = 22.8°$ |
| $f_I = 3.05.$ | $f_F = 3.88$ | |
| $(\beta = 0.10)$ | $d_4 = 0.026.$ | $d_8 = 0.2061$ |
| $(\beta = 0.51)$ | $d_4 = 0.154,$ | $d_8 = 0.2045$ | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, and reference symbol $v_1$ through $v_9$ respectively represent Abbe's numbers of respective lenses.

7. A large aperture ratio photographic lens system according to claim 3 wherein said third lens group comprises a cemented meniscus doublet consisting of a negative lens element and a positive lens element, a positive lens, and a cemented doublet consisting of a positive lens element and a negative lens element, said large aperture ratio photographic lens system having the following numerical data:

| | | |
|---|---|---|
| $r_1 = 1.1102$ | | |
| $d_1 = 0.0396$ | $n_1 = 1.68893$ | $v_1 = 31.08$ |
| $r_2 = 0.7068$ | | |
| $d_2 = 0.0450$ | | |
| $r_3 = 3.2268$ | | |
| $d_3 = 0.0634$ | $n_2 = 1.71300$ | $v_2 = 53.84$ |
| $r_4 = -1.6134$ | | |
| $d_4 = 0.0031$ | | |
| $r_5 = 0.4640$ | | |
| $d_5 = 0.1480$ | $n_3 = 1.77250$ | $v_3 = 49.66$ |
| $r_6 = 1.0230$ | | |
| $d_6 = 0.0274$ | | |
| $r_7 = -6.5917$ | | |
| $d_7 = 0.0235$ | $n_4 = 1.58921$ | $v_4 = 41.08$ |
| $r_8 = 0.4300$ | | |
| $d_8 = 0.2134$ | | |
| $r_9 = -0.4558$ | | |
| $d_9 = 0.0215$ | $n_5 = 1.68250$ | $v_5 = 44.65$ |
| $r_{10} = 1.7661$ | | |
| $d_{10} = 0.1073$ | $n_6 = 1.72000$ | $v_6 = 41.98$ |
| $r_{11} = -0.6363$ | | |
| $d_{11} = 0.0020$ | | |
| $r_{12} = -1.3843$ | | |
| $d_{12} = 0.0446$ | $n_7 = 1.72000$ | $v_7 = 43.70$ |
| $r_{13} = -0.6025$ | | |
| $d_{13} = 0.0020$ | | |
| $r_{14} = 2.1499$ | | |
| $d_{14} = 0.0775$ | $n_8 = 1.72916$ | $v_8 = 54.68$ |
| $r_{15} = -0.5743$ | | |
| $d_{15} = 0.0255$ | $n_9 = 1.75520$ | $v_9 = 27.51$ |
| $r_{16} = -3.4128$ | | |
| $f = 1.$ | F/2.0. | $\omega = 22.8°$ |
| $f_I = 3.07$ | | $f_F = 4.48$ |
| $(\beta = 0.50)$ | | $d_4 = 0.151$ | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, and reference symbols $v_1$ through $v_9$ respectively represent Abbe's numbers of respective lenses.

8. A large aperture ratio photographic lens system according to claim 3 wherein said third lens group comprises a meniscus lens, a positive lens, and a cemented doublet consisting of a positive lens element and a negative lens element, said large aperture ratio photographic lens system having the following numerical data:

| | | |
|---|---|---|
| $r_1 = 1.1356$ | | |
| $d_1 = 0.0396$ | $n_1 = 1.68893$ | $v_1 = 31.08$ |
| $r_2 = 0.7265$ | | |
| $d_2 = 0.0451$ | | |
| $r_3 = 3.1457$ | | |
| $d_3 = 0.0636$ | $n_2 = 1.71300$ | $v_2 = 53.84$ |
| $r_4 = -1.6344$ | | |
| $d_4 = 0.0031$ | | |
| $r_5 = 0.4659$ | | |
| $d_5 = 0.1467$ | $n_3 = 1.77250$ | $v_3 = 49.66$ |
| $r_6 = 1.0347$ | | |
| $d_6 = 0.0275$ | | |

-continued

| | | |
|---|---|---|
| $r_7 = -5.9928$ | | |
| $d_7 = 0.0235$ | $n_4 = 1.58921$ | $\nu_4 = 41.08$ |
| $r_8 = 0.4357$ | | |
| $d_8 = 0.2013$ | | |
| $r_9 = -0.4482$ | | |
| $d_9 = 0.1291$ | $n_5 = 1.71285$ | $\nu_5 = 43.19$ |
| $r_{10} = -0.6286$ | | |
| $d_{10} = 0.0020$ | | |
| $r_{11} = -1.5158$ | | |
| $d_{11} = 0.0450$ | $n_6 = 1.72000$ | $\nu_6 = 43.70$ |
| $r_{12} = -0.5875$ | | |
| $d_{12} = 0.0020$ | | |
| $r_{13} = 1.8771$ | | |
| $d_{13} = 0.0817$ | $n_7 = 1.72916$ | $\nu_7 = 54.68$ |
| $r_{14} = -0.6521$ | | |
| $d_{14} = 0.0255$ | $n_8 = 1.75520$ | $\nu_8 = 27.51$ |
| $r_{15} = -4.8988$ | | |
| $f = 1$, | F/2.0, | $\omega = 22.8°$ |
| $f_I = 2.97$, | | $f_F = 4.16$ |
| ($\beta = 0.50$) | | $d_4 = 0.151$ | where, reference symbols $r_1$ through $r_{15}$ respectively represent radii of curvature of respective lens surfaces, reference symbols $d_1$ through $d_{14}$ respectively represent thicknesses of respective lenses and airspaces between respective lenses, reference symbols $n_1$ through $n_8$ respectively represent refractive indices of respective lenses, and reference symbols $\nu_1$ through $\nu_8$ respectively represent Abbe's numbers of respective lenses.

9. A large aperture ratio photographic lens system according to claim 3 wherein said third lens group comprises a cemented meniscus doublet consisting of a negative lens and a positive lens, a positive lens, a positive lens and a negative lens, said large aperture ratio photographic lens system having the following numerical data:

| | | |
|---|---|---|
| $r_1 = 0.9538$ | | |
| $d_1 = 0.0393$ | $n_1 = 1.68893$ | $\nu_1 = 31.08$ |
| $r_2 = 0.6422$ | | |
| $d_2 = 0.0447$ | | |
| $r_3 = 7.2925$ | | |
| $d_3 = 0.0630$ | $n_2 = 1.71300$ | $\nu_2 = 53.84$ |
| $r_4 = -1.4902$ | | |
| $d_4 = 0.0019$ | | |
| $r_5 = 0.4926$ | | |
| $d_5 = 0.1262$ | $n_3 = 1.77250$ | $\nu_3 = 49.66$ |
| $r_6 = 1.0040$ | | |
| $d_6 = 0.0276$ | | |
| $r_7 = -14.2218$ | | |
| $d_7 = 0.0220$ | $n_4 = 1.58144$ | $\nu_4 = 40.75$ |
| $r_8 = 0.5790$ | | |
| $d_8 = 0.2027$ | | |
| $r_9 = -0.3440$ | | |
| $d_9 = 0.0214$ | $n_5 = 1.68250$ | $\nu_5 = 44.65$ |
| $r_{10} = -0.7648$ | | |
| $d_{10} = 0.1066$ | $n_6 = 1.72000$ | $\nu_6 = 41.98$ |
| $r_{11} = -0.4948$ | | |
| $d_{11} = 0.0019$ | | |
| $r_{12} = -0.8132$ | | |
| $d_{12} = 0.0441$ | $n_7 = 1.77250$ | $\nu_7 = 49.66$ |
| $r_{13} = -0.4937$ | | |
| $d_{13} = 0.0019$ | | |
| $r_{14} = 2.0835$ | | |
| $d_{14} = 0.0778$ | $n_8 = 1.77250$ | $\nu_8 = 49.66$ |
| $r_{15} = -0.6346$ | | |
| $d_{15} = 0.0097$ | | |
| $r_{16} = -0.5772$ | | |
| $d_{16} = 0.0253$ | $n_9 = 1.75520$ | $\nu_9 = 27.51$ |
| $r_{17} = -3.3894$ | | |
| $f = 1$, | F/2.0, | $\omega = 22.8°$ |
| $f_I = 4.05$ | | $f_F = 3.53$ |
| ($\beta = 0.50$) | | $d_4 = 0.110$ | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

10. A large aperture ratio photographic lens system according to claim 3 wherein said third lens group comprises a cemented meniscus doublet consisting of a negative lens element and a positive lens element, a positive lens, and a cemented doublet consisting of a positive lens element and a negative lens element, said large aperture ratio photographic lens system having the following numerical data:

| | | |
|---|---|---|
| $r_1 = 1.2060$ | | |
| $d_1 = 0.0278$ | $n_1 = 1.60342$ | $\nu_1 = 38.01$ |
| $r_2 = 0.5894$ | | |
| $d_2 = 0.0402$ | | |
| $r_3 = 1.8201$ | | |
| $d_3 = 0.0676$ | $n_2 = 1.72916$ | $\nu_2 = 54.68$ |
| $r_4 = -1.783$ | | |
| $d_4 = 0.0024$ | | |
| $r_5 = 0.4099$ | | |
| $d_5 = 0.1216$ | $n_3 = 1.77250$ | $\nu_3 = 49.66$ |
| $r_6 = 0.7540$ | | |
| $d_6 = 0.0304$ | | |
| $r_7 = 4.9772$ | | |
| $d_7 = 0.0233$ | $n_4 = 1.58144$ | $\nu_4 = 40.75$ |
| $r_8 = 0.3856$ | | |
| $d_8 = 0.2032$ | | |
| $r_9 = -0.4730$ | | |
| $d_9 = 0.0216$ | $n_5 = 1.68240$ | $\nu_5 = 44.65$ |
| $r_{10} = 4.6709$ | | |
| $d_{10} = 0.0929$ | $n_6 = 1.72000$ | $\nu_6 = 46.03$ |
| $r_{11} = -0.7102$ | | |
| $d_{11} = 0.0020$ | | |
| $r_{12} = -1.6505$ | | |
| $d_{12} = 0.0573$ | $n_7 = 1.77250$ | $\nu_7 = 49.66$ |
| $r_{13} = -0.5942$ | | |
| $d_{13} = 0.0020$ | | |
| $r_{14} = 3.5444$ | | |
| $d_{14} = 0.0845$ | $n_8 = 1.77250$ | $\nu_8 = 49.66$ |
| $r_{15} = -0.6641$ | | |
| $d_{15} = 0.0255$ | $n_9 = 1.75520$ | $\nu_9 = 27.51$ |
| $r_{16} = -4.3126$ | | |
| $f = 1$, | F/2.0, | $\omega = 22.8°$ |
| $f_I = 3.15$, | | $f_F = 4.22$ |
| ($\beta = 0.50$) | | $d_4 = 0.0802$ | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

* * * * *